(12) United States Patent
Lockhart et al.

(10) Patent No.: US 11,131,822 B2
(45) Date of Patent: Sep. 28, 2021

(54) FIBER-OPTIC BREAKOUT TRANSITION ASSEMBLY

(71) Applicant: COMMSCOPE TECHNOLOGIES LLC, Hickory, NC (US)

(72) Inventors: Paula Lockhart, Montgomery, MN (US); Clair Iburg, Rosemount, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/611,712

(22) PCT Filed: Apr. 27, 2018

(86) PCT No.: PCT/US2018/029984
§ 371 (c)(1),
(2) Date: Nov. 7, 2019

(87) PCT Pub. No.: WO2018/208518
PCT Pub. Date: Nov. 15, 2018

(65) Prior Publication Data
US 2020/0103609 A1 Apr. 2, 2020

Related U.S. Application Data

(60) Provisional application No. 62/503,101, filed on May 8, 2017.

(51) Int. Cl.
*G02B 6/44* (2006.01)
(52) U.S. Cl.
CPC .................. *G02B 6/4472* (2013.01)

(58) Field of Classification Search
None
See application file for complete search history.

(56) References Cited

U.S. PATENT DOCUMENTS

| 4,299,244 A | 11/1981 | Hirai |
| 4,351,579 A | 9/1982 | Kordes et al. |

(Continued)

FOREIGN PATENT DOCUMENTS

| AT | 408 698 B | 2/2002 |
| CN | 1289930 C | 12/2006 |

(Continued)

OTHER PUBLICATIONS

Exhibit A: Fanout product by ADC Telecommunications, Inc., 2 pages, admitted as prior art as of Oct. 13, 2016.

(Continued)

*Primary Examiner* — Michelle R Connelly
(74) *Attorney, Agent, or Firm* — Merchant & Gould P.C.

(57) ABSTRACT

A breakout transition assembly including a plurality of optical fibers extending through a cable, a plurality of furcation tubes and a housing with a cable inlet and a furcation chamber. The cable, optical fibers and furcation tubes are fixed relative to the housing with a volume of hardened epoxy in the furcation chamber. The cable inlet includes a clearance that tapers between a first end and a second end. In another aspect, the breakout transition can also include a breakout holder comprising at least one guide, such that the plurality of furcation tubes are fixedly received in the at least one guide in the breakout holder, and the volume of hardened epoxy retains the breakout holder in an engaged position with the transition body.

25 Claims, 16 Drawing Sheets

(56) References Cited

U.S. PATENT DOCUMENTS

| | | | |
|---|---|---|---|
| 4,435,612 A | 3/1984 | Smith | |
| 4,441,786 A | 4/1984 | Hulin et al. | |
| 4,453,291 A | 6/1984 | Fidych | |
| 4,461,529 A | 7/1984 | Fariss | |
| 4,582,067 A | 4/1986 | Silverstein et al. | |
| 4,650,933 A | 3/1987 | Benda et al. | |
| 4,684,211 A | 8/1987 | Weber et al. | |
| 4,768,961 A | 9/1988 | Lau | |
| 4,770,639 A | 9/1988 | Lau | |
| 4,775,121 A | 10/1988 | Carty | |
| 4,791,245 A | 12/1988 | Thornley | |
| 4,797,114 A | 1/1989 | Lau | |
| 4,820,200 A | 4/1989 | Lau | |
| 4,840,568 A | 6/1989 | Burroughs et al. | |
| 4,917,491 A | 4/1990 | Ring et al. | |
| 5,083,346 A | 1/1992 | Orton | |
| 5,133,583 A | 7/1992 | Wagman et al. | |
| 5,135,265 A | 8/1992 | Bouscher et al. | |
| 5,146,532 A | 9/1992 | Hodge | |
| 5,189,410 A | 2/1993 | Kosugi et al. | |
| 5,199,878 A | 4/1993 | Dewey et al. | |
| 5,214,673 A | 5/1993 | Morgenstern et al. | |
| 5,231,688 A | 7/1993 | Zimmer | |
| 5,317,663 A | 5/1994 | Beard et al. | |
| 5,339,379 A | 8/1994 | Kutsch et al. | |
| 5,363,465 A | 11/1994 | Korkowski et al. | |
| 5,364,389 A | 11/1994 | Anderson | |
| 5,381,501 A | 1/1995 | Cardinal et al. | |
| 5,393,249 A | 2/1995 | Morgenstern et al. | |
| 5,416,874 A | 5/1995 | Giebel et al. | |
| 5,432,875 A | 7/1995 | Korkowski et al. | |
| 5,467,062 A | 11/1995 | Burroughs | |
| 5,473,718 A | 12/1995 | Sommer | |
| 5,497,444 A | 3/1996 | Wheeler | |
| 5,514,128 A | 5/1996 | Hillsman et al. | |
| 5,554,026 A | 9/1996 | Van Hale | |
| 5,582,525 A | 12/1996 | Louwagie et al. | |
| 5,598,500 A | 1/1997 | Crespel | |
| 5,613,030 A | 3/1997 | Hoffer et al. | |
| 5,627,925 A | 5/1997 | Alferness et al. | |
| 5,645,519 A | 7/1997 | Lee et al. | |
| 5,649,042 A | 7/1997 | Saito | |
| 5,685,741 A | 11/1997 | Dewey et al. | |
| 5,694,511 A | 12/1997 | Pimpinella et al. | |
| 5,701,380 A | 12/1997 | Larson et al. | |
| 5,717,810 A | 2/1998 | Wheeler | |
| 5,754,725 A | 5/1998 | Kuder et al. | |
| 5,838,861 A | 11/1998 | Bunde | |
| 5,863,083 A | 1/1999 | Giebel et al. | |
| 5,879,075 A | 3/1999 | Conner et al. | |
| 5,915,055 A * | 6/1999 | Bennett | G02B 6/2551 |
| | | | 385/100 |
| 5,946,440 A | 8/1999 | Puetz | |
| 5,970,195 A | 10/1999 | Brown | |
| 6,072,932 A | 6/2000 | Bennett et al. | |
| 6,104,855 A | 8/2000 | Jeon | |
| 6,116,961 A | 9/2000 | Henneberger et al. | |
| 6,208,796 B1 | 3/2001 | Vigliaturo | |
| 6,226,111 B1 | 5/2001 | Chang et al. | |
| 6,259,851 B1 | 7/2001 | Daoud | |
| 6,263,136 B1 | 7/2001 | Jennings et al. | |
| 6,278,831 B1 | 8/2001 | Henderson et al. | |
| 6,307,998 B2 | 10/2001 | Vigliaturo | |
| 6,328,608 B1 | 12/2001 | Olson et al. | |
| 6,363,183 B1 | 3/2002 | Koh | |
| 6,363,198 B1 | 3/2002 | Braga et al. | |
| 6,370,294 B1 | 4/2002 | Pfeiffer et al. | |
| 6,389,214 B1 | 5/2002 | Smith et al. | |
| 6,418,262 B1 | 7/2002 | Puetz et al. | |
| 6,421,493 B1 | 7/2002 | Burek et al. | |
| 6,424,781 B1 | 7/2002 | Puetz et al. | |
| 6,511,330 B1 | 1/2003 | Norris | |
| 6,532,332 B2 | 3/2003 | Solheid et al. | |
| 6,535,682 B1 | 3/2003 | Puetz et al. | |
| 6,554,652 B1 | 4/2003 | Musolf et al. | |
| 6,556,738 B2 | 4/2003 | Pfeiffer et al. | |
| 6,556,763 B1 | 4/2003 | Puetz et al. | |
| 6,571,048 B1 | 5/2003 | Bechamps et al. | |
| 6,579,014 B2 | 6/2003 | Melton et al. | |
| 6,591,051 B2 | 7/2003 | Solheid et al. | |
| 6,599,024 B2 | 7/2003 | Zimmel | |
| 6,614,953 B2 | 9/2003 | Strasser et al. | |
| 6,614,979 B2 | 9/2003 | Bourdeau | |
| 6,616,459 B2 | 9/2003 | Norris | |
| 6,623,173 B1 | 9/2003 | Grois et al. | |
| 6,632,106 B2 | 10/2003 | Musolf et al. | |
| RE38,311 E | 11/2003 | Wheeler | |
| 6,647,197 B1 | 11/2003 | Marrs et al. | |
| 6,655,848 B2 | 12/2003 | Simmons et al. | |
| 6,668,108 B1 | 12/2003 | Helkey et al. | |
| 6,669,627 B1 | 12/2003 | Campbell et al. | |
| 6,688,780 B2 | 2/2004 | Duran | |
| 6,719,382 B2 | 4/2004 | Sucharczuk et al. | |
| 6,738,555 B1 | 5/2004 | Cooke et al. | |
| 6,760,531 B1 | 7/2004 | Solheid et al. | |
| 6,761,594 B2 | 7/2004 | Johnsen et al. | |
| 6,810,193 B1 | 10/2004 | Muller | |
| 6,814,620 B1 | 11/2004 | Wu | |
| 6,822,874 B1 | 11/2004 | Marler | |
| 6,824,312 B2 | 11/2004 | McClellan et al. | |
| 6,830,465 B2 | 12/2004 | Norris et al. | |
| 6,832,035 B1 | 12/2004 | Daoud et al. | |
| 6,848,952 B2 | 2/2005 | Norris | |
| 6,850,685 B2 | 2/2005 | Tinucci et al. | |
| 6,863,446 B2 | 3/2005 | Ngo | |
| 6,867,668 B1 | 3/2005 | Dagostino et al. | |
| 6,873,772 B2 | 3/2005 | Nakaya | |
| 6,885,798 B2 | 4/2005 | Zimmel | |
| 6,890,187 B2 | 5/2005 | Norris | |
| 6,909,828 B2 | 6/2005 | Zimmel et al. | |
| 6,937,807 B2 | 8/2005 | Franklin et al. | |
| 6,983,095 B2 | 1/2006 | Reagan et al. | |
| 6,993,237 B2 | 1/2006 | Cooke et al. | |
| 7,029,322 B2 | 4/2006 | Ernst et al. | |
| 7,035,510 B2 | 4/2006 | Zimmel et al. | |
| 7,118,284 B2 | 10/2006 | Nakajima et al. | |
| 7,121,732 B2 | 10/2006 | Pimpinella et al. | |
| 7,142,764 B2 | 11/2006 | Allen et al. | |
| 7,190,874 B1 | 3/2007 | Barth et al. | |
| 7,194,181 B2 | 3/2007 | Holmberg et al. | |
| 7,218,827 B2 | 5/2007 | Vongseng et al. | |
| 7,221,832 B2 | 5/2007 | Tinucci | |
| 7,228,047 B1 | 6/2007 | Szilagyi et al. | |
| 7,233,731 B2 | 6/2007 | Solheid et al. | |
| 7,269,319 B2 | 9/2007 | Zimmel | |
| 7,270,485 B1 | 9/2007 | Robinson et al. | |
| 7,277,614 B2 | 10/2007 | Cody et al. | |
| 7,280,725 B2 | 10/2007 | Brown et al. | |
| 7,303,220 B2 | 12/2007 | Zellak | |
| 7,310,474 B2 | 12/2007 | Kanaski et al. | |
| 7,333,606 B1 | 2/2008 | Swam et al. | |
| 7,346,254 B2 | 3/2008 | Kramer et al. | |
| 7,349,616 B1 | 3/2008 | Castonguay et al. | |
| 7,376,322 B2 | 5/2008 | Zimmel et al. | |
| 7,376,323 B2 | 5/2008 | Zimmel | |
| 7,400,813 B2 | 7/2008 | Zimmel | |
| 7,418,181 B2 | 8/2008 | Zimmel et al. | |
| 7,418,186 B1 | 8/2008 | Grubish et al. | |
| 7,440,669 B2 | 10/2008 | Tinucci | |
| 7,453,706 B2 | 11/2008 | Clark et al. | |
| 7,470,068 B2 | 12/2008 | Kahle et al. | |
| 7,485,806 B1 | 2/2009 | Gretz | |
| 7,495,931 B2 | 2/2009 | Clark et al. | |
| 7,499,622 B2 | 3/2009 | Castonguay et al. | |
| 7,606,459 B2 | 10/2009 | Zimmel et al. | |
| 7,636,507 B2 | 12/2009 | Lu et al. | |
| 7,641,396 B2 | 1/2010 | Feldner | |
| 7,664,363 B1 * | 2/2010 | Mowery, Sr. | G02B 6/3887 |
| | | | 385/137 |
| 7,711,236 B2 | 5/2010 | Gonzalez et al. | |
| 7,738,759 B2 | 6/2010 | Parikh et al. | |
| 7,748,911 B2 | 7/2010 | Keenum et al. | |
| 7,853,112 B2 | 12/2010 | Zimmel et al. | |
| 7,885,505 B2 | 2/2011 | Zimmel | |

(56) References Cited

U.S. PATENT DOCUMENTS

| | | |
|---|---|---|
| 7,912,336 B2 | 3/2011 | Zimmel |
| 7,933,484 B2 | 4/2011 | Hetzer et al. |
| 8,081,857 B2 | 12/2011 | Nair et al. |
| 8,172,465 B2 | 5/2012 | Kleeberger |
| 8,290,333 B2 * | 10/2012 | Barlowe ............. G02B 6/4471 385/137 |
| 8,346,045 B2 | 1/2013 | Zimmel et al. |
| 8,380,036 B2 | 2/2013 | Smith et al. |
| 8,573,855 B2 | 11/2013 | Nhep |
| 8,577,199 B2 | 11/2013 | Pierce et al. |
| 8,620,130 B2 | 12/2013 | Cooke et al. |
| 8,705,930 B2 | 4/2014 | Lu et al. |
| 8,737,786 B1 | 5/2014 | Compton et al. |
| 8,798,428 B2 | 8/2014 | Zimmel et al. |
| 8,824,841 B1 | 9/2014 | Mullen |
| 8,824,850 B2 | 9/2014 | Garcia et al. |
| 9,140,872 B2 * | 9/2015 | Sedor .................. G02B 6/4472 |
| 9,151,923 B2 | 10/2015 | Nielson et al. |
| 9,395,509 B2 | 7/2016 | Petersen et al. |
| 10,054,753 B2 | 8/2018 | Petersen et al. |
| 10,564,363 B1 | 2/2020 | Corl et al. |
| 2002/0037193 A1 | 3/2002 | Gibbons et al. |
| 2002/0062978 A1 | 5/2002 | Sakabe et al. |
| 2002/0131750 A1 | 9/2002 | Holman et al. |
| 2002/0141724 A1 | 10/2002 | Ogawa et al. |
| 2002/0181896 A1 | 12/2002 | McClellan et al. |
| 2003/0031423 A1 | 2/2003 | Zimmel |
| 2003/0031437 A1 | 2/2003 | Simmons et al. |
| 2003/0081916 A1 | 5/2003 | Norris |
| 2003/0122040 A1 | 7/2003 | Pisczak |
| 2003/0132685 A1 | 7/2003 | Sucharczuk et al. |
| 2003/0134541 A1 | 7/2003 | Johnsen et al. |
| 2003/0147597 A1 | 8/2003 | Duran |
| 2003/0169974 A1 | 9/2003 | Ngo |
| 2003/0185535 A1 | 10/2003 | Tinucci et al. |
| 2003/0202765 A1 | 10/2003 | Franklin et al. |
| 2003/0210875 A1 | 11/2003 | Wagner et al. |
| 2004/0094605 A1 | 5/2004 | Wild et al. |
| 2004/0126069 A1 | 7/2004 | Jong et al. |
| 2004/0141707 A1 * | 7/2004 | Mozolowski ........ G02B 6/3878 385/137 |
| 2004/0156609 A1 | 8/2004 | Lanier et al. |
| 2004/0161970 A1 | 8/2004 | Wlos et al. |
| 2004/0184748 A1 | 9/2004 | Clatanoff et al. |
| 2004/0240826 A1 | 12/2004 | Daoud et al. |
| 2004/0266273 A1 | 12/2004 | Wu |
| 2005/0002633 A1 | 1/2005 | Solheid et al. |
| 2005/0003707 A1 | 1/2005 | Wu |
| 2005/0041926 A1 | 2/2005 | Elkins, II et al. |
| 2005/0053341 A1 | 3/2005 | Zimmel |
| 2005/0058402 A1 | 3/2005 | Ernst et al. |
| 2005/0067847 A1 | 3/2005 | Zellak |
| 2005/0105873 A1 | 5/2005 | Reagan et al. |
| 2005/0105879 A1 | 5/2005 | Kanasaki et al. |
| 2005/0111811 A1 | 5/2005 | Cooke et al. |
| 2005/0167147 A1 | 8/2005 | Marsac et al. |
| 2005/0232550 A1 | 10/2005 | Nakajima et al. |
| 2005/0232551 A1 | 10/2005 | Chang et al. |
| 2005/0232565 A1 | 10/2005 | Heggestad et al. |
| 2005/0265668 A1 | 12/2005 | Martin |
| 2005/0281526 A1 | 12/2005 | Vongseng et al. |
| 2006/0083468 A1 | 4/2006 | Kahle et al. |
| 2006/0093301 A1 | 5/2006 | Zimmel et al. |
| 2006/0120672 A1 | 6/2006 | Cody et al. |
| 2006/0153516 A1 | 7/2006 | Napiorkowski et al. |
| 2006/0169469 A1 | 8/2006 | Eastwood et al. |
| 2006/0188210 A1 | 8/2006 | Zimmel |
| 2006/0233508 A1 | 10/2006 | Mann et al. |
| 2006/0269198 A1 | 11/2006 | Blazer et al. |
| 2006/0269205 A1 | 11/2006 | Zimmel |
| 2006/0269206 A1 | 11/2006 | Zimmel |
| 2006/0285807 A1 | 12/2006 | Lu et al. |
| 2007/0036503 A1 | 2/2007 | Solheid et al. |
| 2007/0047893 A1 | 3/2007 | Kramer et al. |
| 2007/0117437 A1 | 5/2007 | Boehnlein et al. |
| 2007/0147765 A1 | 6/2007 | Gniadek et al. |
| 2007/0172172 A1 | 7/2007 | Theuerkorn et al. |
| 2007/0189692 A1 | 8/2007 | Zimmel et al. |
| 2007/0212004 A1 | 9/2007 | Lu et al. |
| 2008/0026647 A1 | 1/2008 | Boehnlein et al. |
| 2008/0063351 A1 | 3/2008 | Elkins et al. |
| 2008/0124039 A1 | 5/2008 | Gniadek et al. |
| 2008/0138020 A1 | 6/2008 | Robinson et al. |
| 2008/0138026 A1 | 6/2008 | Yow et al. |
| 2008/0164059 A1 | 7/2008 | Cipolla |
| 2008/0175541 A1 | 7/2008 | Lu et al. |
| 2008/0248673 A1 | 10/2008 | Boehnlein et al. |
| 2008/0253730 A1 | 10/2008 | Cox et al. |
| 2008/0317415 A1 | 12/2008 | Hendrickson et al. |
| 2009/0002689 A1 | 1/2009 | Cobb, III et al. |
| 2009/0022468 A1 | 1/2009 | Zimmel |
| 2009/0022469 A1 | 1/2009 | Zimmel et al. |
| 2009/0035987 A1 | 2/2009 | Daly et al. |
| 2009/0060421 A1 | 3/2009 | Parikh et al. |
| 2009/0067804 A1 | 3/2009 | Knorr et al. |
| 2009/0103881 A1 | 4/2009 | Gonzalez et al. |
| 2009/0116806 A1 | 5/2009 | Zimmel et al. |
| 2009/0196553 A1 | 8/2009 | Anderson et al. |
| 2010/0027942 A1 | 2/2010 | Smith et al. |
| 2010/0030033 A1 | 2/2010 | Farley et al. |
| 2010/0054860 A1 | 3/2010 | Thompson et al. |
| 2010/0059229 A1 | 3/2010 | Smith et al. |
| 2010/0086260 A1 | 4/2010 | Parikh et al. |
| 2010/0092136 A1 | 4/2010 | Nhep |
| 2010/0150504 A1 | 6/2010 | Allen et al. |
| 2010/0158464 A1 | 6/2010 | Zimmel et al. |
| 2010/0215331 A1 | 8/2010 | Gonzalez et al. |
| 2010/0266244 A1 | 10/2010 | Lu et al. |
| 2011/0024103 A1 | 2/2011 | Storm et al. |
| 2011/0081121 A1 | 4/2011 | Le Dissez |
| 2011/0164853 A1 | 7/2011 | Corbille et al. |
| 2011/0182558 A1 | 7/2011 | Garcia et al. |
| 2011/0229098 A1 | 9/2011 | Abernathy et al. |
| 2011/0257563 A1 | 10/2011 | Thapliyal et al. |
| 2011/0262084 A1 | 10/2011 | Ott |
| 2011/0284285 A1 | 11/2011 | Miura et al. |
| 2011/0317975 A1 * | 12/2011 | Lu ........................ G02B 6/3878 385/137 |
| 2012/0008909 A1 | 1/2012 | Mertesdorf et al. |
| 2012/0045178 A1 | 2/2012 | Theuerkorn |
| 2012/0186845 A1 | 7/2012 | Eshima et al. |
| 2012/0230636 A1 | 9/2012 | Blockley et al. |
| 2012/0301090 A1 | 11/2012 | Cline et al. |
| 2012/0328253 A1 | 12/2012 | Hurley et al. |
| 2013/0011105 A1 | 1/2013 | Barlowe et al. |
| 2013/0077928 A1 | 3/2013 | Hsing |
| 2013/0114937 A1 | 5/2013 | Zimmel et al. |
| 2013/0183012 A1 * | 7/2013 | Cabanne Lopez ... G02B 6/4471 385/100 |
| 2013/0209042 A1 | 8/2013 | Belenky et al. |
| 2013/0209043 A1 | 8/2013 | Norris et al. |
| 2013/0294735 A1 | 11/2013 | Burris et al. |
| 2013/0330967 A1 | 12/2013 | Youtsey |
| 2014/0083229 A1 | 3/2014 | Kume |
| 2014/0093217 A1 | 4/2014 | Lu et al. |
| 2014/0126873 A1 | 5/2014 | Cooke et al. |
| 2014/0133823 A1 | 5/2014 | Simmons et al. |
| 2014/0140664 A1 | 5/2014 | Islam |
| 2014/0140671 A1 * | 5/2014 | Islam .................. G02B 6/4471 385/101 |
| 2014/0219621 A1 | 8/2014 | Barnette, Jr. et al. |
| 2014/0233903 A1 | 8/2014 | Valderrabano |
| 2014/0241674 A1 | 8/2014 | Isenhour et al. |
| 2014/0248798 A1 | 9/2014 | Youtsey |
| 2015/0078720 A1 | 3/2015 | Sedor et al. |
| 2015/0110442 A1 | 4/2015 | Zimmel et al. |
| 2015/0155697 A1 | 6/2015 | Loveless et al. |
| 2015/0168657 A1 | 6/2015 | Islam |
| 2015/0226927 A1 | 8/2015 | Islam |
| 2015/0260936 A1 | 9/2015 | Newbury et al. |
| 2015/0284036 A1 | 10/2015 | Miles |
| 2015/0370029 A1 | 12/2015 | Petersen et al. |
| 2016/0004016 A1 | 1/2016 | Zimmel et al. |
| 2016/0139355 A1 | 5/2016 | Petersen |

(56) References Cited

U.S. PATENT DOCUMENTS

| | | | |
|---|---|---|---|
| 2016/0178850 A1 | 6/2016 | Nhep | |
| 2016/0363733 A1 | 12/2016 | Nielson et al. | |
| 2017/0102506 A1* | 4/2017 | Newbury | G02B 6/3879 |
| 2017/0212313 A1 | 7/2017 | Elenabaas et al. | |
| 2017/0269319 A1* | 9/2017 | Miller | G02B 6/4459 |
| 2018/0149823 A1 | 5/2018 | Wang et al. | |
| 2018/0196211 A1* | 7/2018 | Agata | G02B 6/44 |
| 2019/0004272 A1 | 1/2019 | Field | |
| 2019/0056562 A1 | 2/2019 | Petersen | |

FOREIGN PATENT DOCUMENTS

| | | |
|---|---|---|
| DE | 41 30 706 A1 | 3/1993 |
| DE | 44 05 459 A1 | 8/1995 |
| DE | 202 01 170 U1 | 5/2002 |
| DE | 102 07 337 A1 | 11/2002 |
| DE | 10 2004 019 805 A1 | 11/2005 |
| DE | 20 2006 006 016 U1 | 8/2006 |
| DE | 10 2007 009 223 A1 | 8/2008 |
| EP | 0 202 994 A1 | 11/1986 |
| EP | 0 339 791 A1 | 11/1989 |
| EP | 0 355 639 A2 | 2/1990 |
| EP | 0 490 698 A1 | 6/1992 |
| EP | 0 646 811 A2 | 4/1995 |
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 2/2002 |
| EP | 1 473 578 A2 | 11/2004 |
| EP | 1 589 361 A1 | 10/2005 |
| GB | 1 129 287 A | 10/1968 |
| GB | 2 300 978 A | 11/1996 |
| JP | H01-317824 A | 12/1989 |
| WO | 96/36896 A1 | 11/1996 |
| WO | 00/75706 A2 | 12/2000 |
| WO | 02/39170 A2 | 5/2002 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |
| WO | 2008/059212 A1 | 5/2008 |
| WO | 2010/042507 A1 | 4/2010 |
| WO | 2015/200321 A1 | 12/2015 |
| WO | 2015/200327 A1 | 12/2015 |
| WO | 2016/110245 A1 | 7/2016 |
| WO | 2016/123092 A1 | 8/2016 |
| WO | 2017/020076 A1 | 2/2017 |
| WO | 2017/161310 A1 | 9/2017 |
| WO | 2018/044729 A1 | 3/2018 |

OTHER PUBLICATIONS

Exhibit B: Fanout Product by ADC Telecommunications, Inc., 5 pages, admitted as prior art as of Oct. 13, 2016.
Exhibit C: Fanout Product by ADC Telecommunications, Inc., 7 pages, admitted as prior art as of Oct. 13, 2016.
24 Fiber Transition Housing by ADC Telecommunications, Inc., 2 pages, admitted as prior art as of Jun. 25, 2010.
International Search Report and Written Opinion of the International Searching Authority for International Patent Application No. PCT/US2018/029984 dated Aug. 14, 2018, 12 pages.
Extended European Search Report for European Patent Application No. 18797870.5 dated Dec. 23, 2020, 7 pages.

* cited by examiner

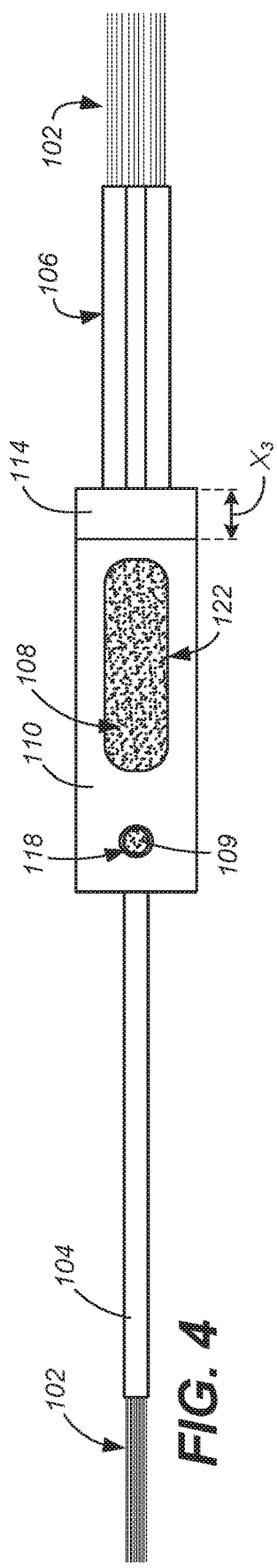
*FIG. 4*
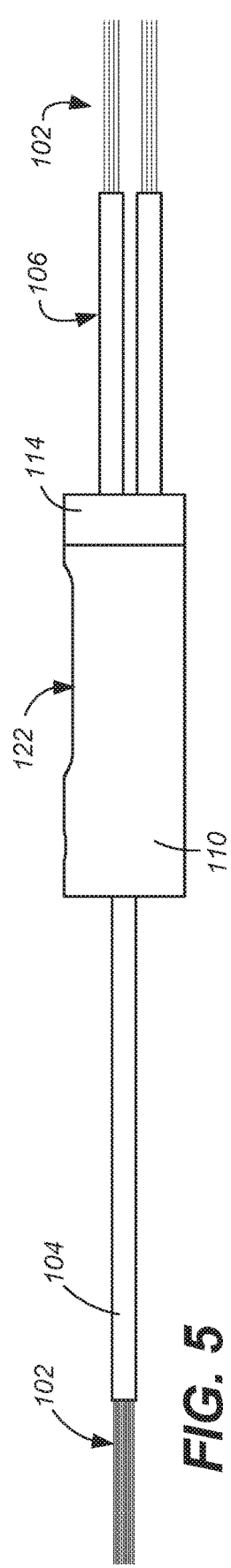
*FIG. 5*
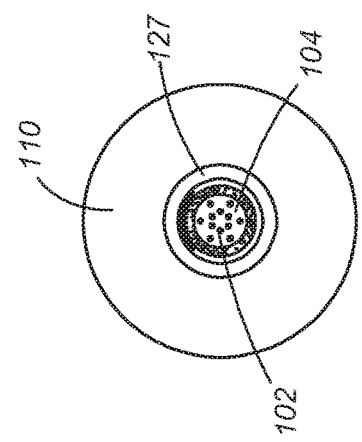
*FIG. 6*
*FIG. 7*

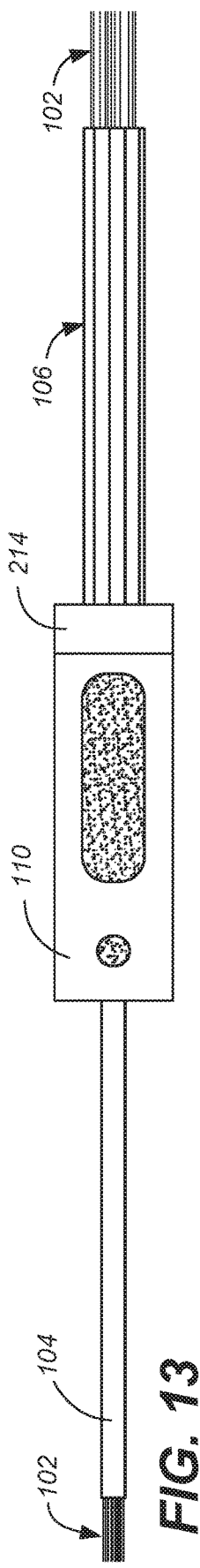
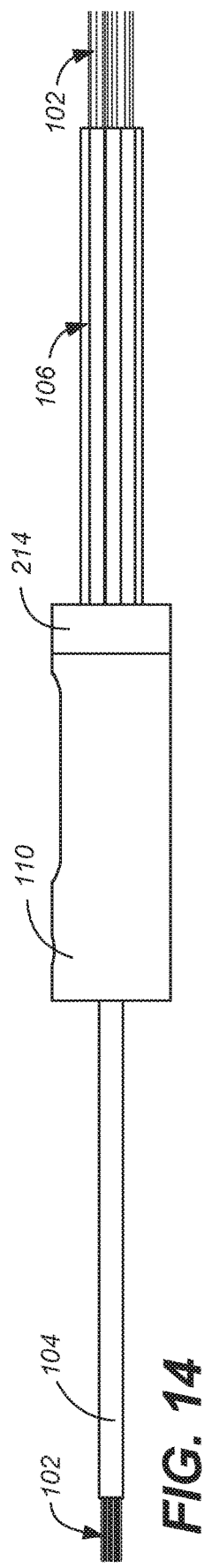
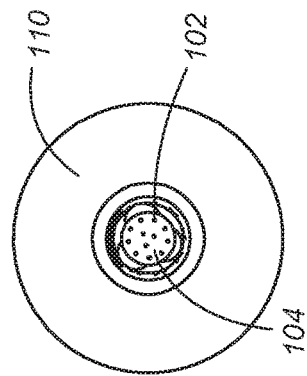

FIBER-OPTIC BREAKOUT TRANSITION ASSEMBLY

CROSS-REFERENCE TO RELATED APPLICATION

This application is a National Stage Application of PCT/US2018/029984, filed on Apr. 27, 2018, which claims the benefit of U.S. Patent Application Ser. No. 62/503,101, filed on May 8, 2017, the disclosures of which are incorporated herein by reference in their entireties. To the extent appropriate, a claim of priority is made to each of the above disclosed applications.

TECHNICAL FIELD

The present disclosure relates generally to an optical fiber breakout assembly, and more specifically to a fiber-optic cable breakout transition assembly from a single cable to a plurality of cables.

BACKGROUND

Fiber-optic cables often contain one or more individual optical fibers within a jacket (or outer covering). It is desirable to remove the jacket to expose the individual optical fibers, such as for connectorization in order to connect each fiber to telecommunications equipment. Breaking-out or furcating of optical fibers from within one fiber-optic cable into a plurality of smaller individual upjacket (or furcation) tubes is known. Typically, the optical fibers are inserted into the upjacket tubes before connectorization to provide protection of the optical fiber, including during connectorization. Typically, the upjacket tubes includes an aramid yarn strength member, or other strength member to transfer any loads to the optical connector terminated onto the upjacket tube, or to the jacket of the fiber-optic cable containing the optical fibers, instead of to the optical fiber. There is a need for improved devices and methods for protecting the optical fibers when they are being broken out or furcated.

SUMMARY

According to an aspect of the invention, the present disclosure relates to a breakout transition assembly that includes a plurality of optical fibers extending through a cable, a plurality of furcation tubes and a housing comprising a cable inlet and a furcation chamber. The cable, optical fibers and furcation tubes are fixed relative to the housing with a volume of hardened epoxy in the furcation chamber. The cable inlet includes a clearance that tapers between a first end and a second end.

According to another aspect of the invention, the present disclosure relates to a breakout transition assembly that includes a plurality of optical fibers extending through a cable, a plurality of furcation tubes and a transition body including a cable inlet and a furcation chamber. The cable, optical fibers and furcation tubes are fixed relative to the transition body with a volume of hardened epoxy in the furcation chamber. The breakout transition also includes a breakout holder with at least one guide. The plurality of furcation tubes are fixedly received in the at least one guide in the breakout holder. The volume of hardened epoxy retains the breakout holder in an engaged position with the transition body.

According to still another aspect of the present invention, the present disclosure relates to a method of assembling a breakout transition assembly. The method includesnexposing a length of a plurality of optical fibers from within a multi-fiber cable. The method also includes inserting the exposed plurality of optical fibers through a cable inlet in a housing. The multi-fiber cable is fixed within the cable inlet and the plurality of optical fibers extend through a chamber in the housing. The method further includes inserting the plurality of optical fibers through at least one breakout guide. The method further includes fitting a plurality of furcation tubes over the plurality of optical fibers, and engaging the at least one breakout guide with the housing. The method further includes fixing the housing, breakout guide, cable, optical fibers and furcation tubes together in a single body with a plurality of hardening exposy injected into the chamber.

BRIEF DESCRIPTION OF THE DRAWINGS

FIG. 4 is a top view of the transition assembly shown in FIG. 2.

FIG. 5 is a longitudinal side view of the transition assembly shown in FIGS. 2 and 4.

FIG. 6 is a right end view of the transition assembly shown in FIG. 2.

FIG. 7 is a left end view of the transition assembly shown in FIG. 2.

FIG. 13 is a top view of the transition assembly shown in FIG. 11.

FIG. 14 is a longitudinal side view of the transition assembly shown in FIGS. 11 and 13.

FIG. 15 is a right end view of the transition assembly shown in FIG. 11.

FIG. 16 is an end side view of the transition assembly shown in FIG. 11.

DESCRIPTION OF EXAMPLE EMBODIMENTS

Figure 1:
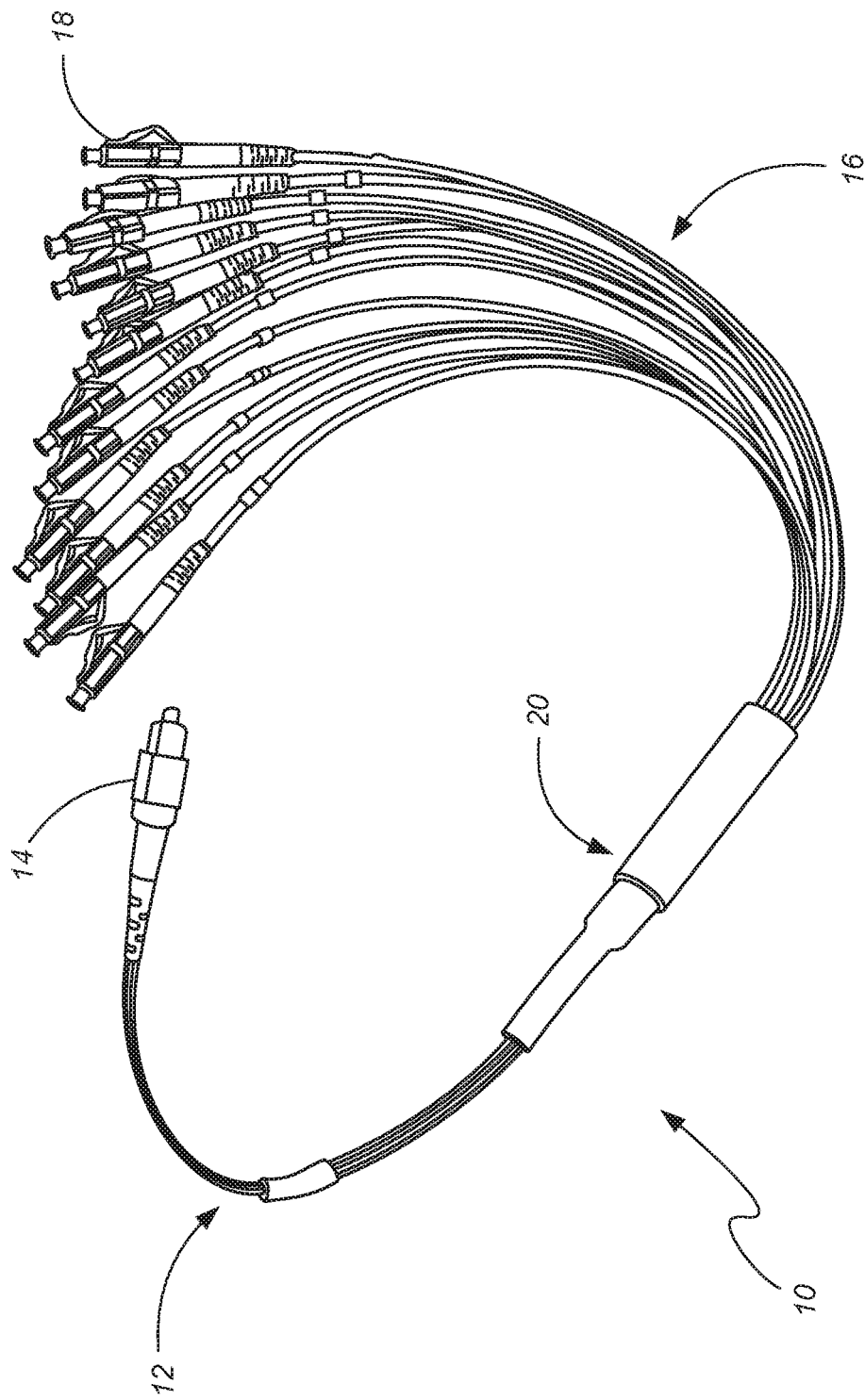
FIG. 1 is an assembly view of an example prior art breakout cable.
Figure 2:
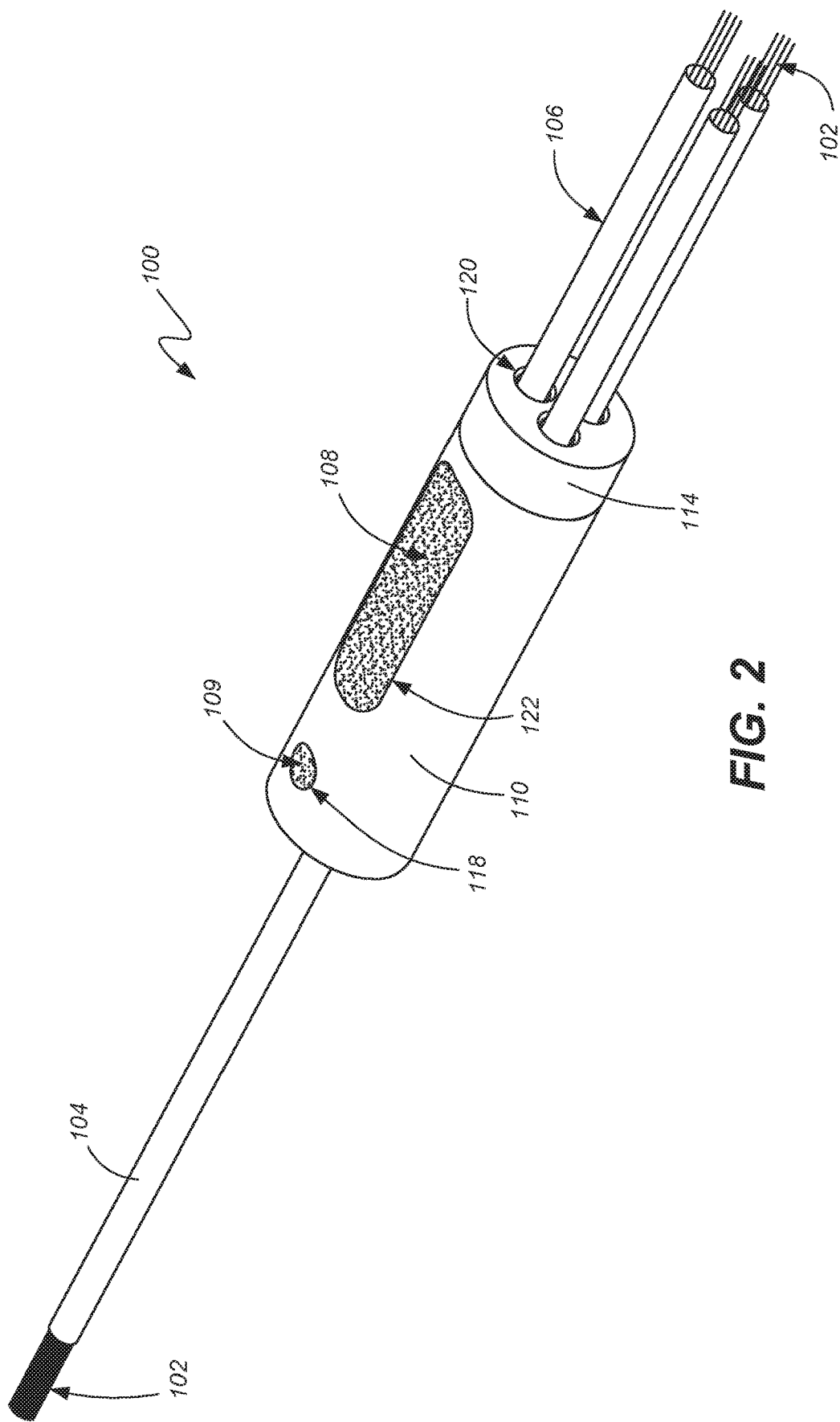
FIG. 2 is a right end perspective view of a transition assembly, according to an example embodiment of the disclosure.

A fiber-optic breakout assembly is described to assist forming a breakout cable by transitioning a single cable carrying multiple optical fibers into a plurality of individual furcation (or upjacket) tubes (or cables), each carrying one of the multiple optical fibers. An example prior art breakout cable 10 is illustrated in FIG. 1. The illustrated breakout cable 10 includes a multi-fiber cable 12 supporting a multi-fiber connector 14 and carrying multiple optical fibers (not shown) within the cable. The illustrated breakout cable 10 also includes a plurality of furcation tubes 16, each supporting a fiber-optic connector 18 and each carrying one of the plurality of optical fibers travelling through the multi-fiber cable 12. Preferably, an equivalent number of furcation tubes is used to the number of optical fibers. In other examples, more than one fiber can be organized into groups and inserted into each tube 16.

An illustrated breakout 20 (or breakout: shield, apparatus, sleeve) protects the plurality of optical fibers as they transition from within the multi-fiber cable 12 into the plurality of furcation tubes 16. As illustrated, the multi-fiber cable 10 is inserted into the breakout 20 on one side and the plurality of furcation tubes 16 are inserted into the breakout on the opposite side.

A transition assembly (or apparatus or device) can function to improve the transition of the optical fibers from a single larger cable, for example cable 12, into a plurality of smaller furcation tubes, for example tubes 16. Such a transition assembly can be supported (or contained or held) within a shield structure, such as the illustrated breakout 20 in FIG. 1, so as to receive a single cable and a plurality of furcation tubes; transitioning the optical fibers therebetween.

An example wider multi-fiber cable can have a diameter of between about 3.6 mm and 4.0 mm, and more preferably about 3.8 mm. This wider multi-fiber cable can hold a plurality of optical fibers, for example between about 20 and 28, and more preferably 24. Another example smaller multi-fiber cable can have a diameter of between about 2.8 mm and 3.2 mm, more preferably about 3.0 mm. This smaller multi-fiber cable can hold between about 10 and 14 optical fibers, and more preferably 12. However, the total size of the multi-fiber cable and the number of optical fibers carried can vary.

An improved transition assembly is provided to allow variable and interchangeable assemblies depending on need and circumstances. The improved transition assembly includes a transition housing which receives a multi-fiber cable carrying one or a plurality of optical fibers. The transition assembly also includes a breakout holder, or end cap, to receive a plurality of furcation tubes. The number and size of furcation tubes received in the breakout holder can vary. A plurality of optical fibers are broken out of the multi-fiber cable and transitioned into the furcation tubes across the transition housing and the breakout holder. Depending on need, the transition assembly can function with the same transition housing, but different breakout holders. For example, if only three furcation tubes are required, it is possible for a breakout holder to have three breakout guides. Alternatively, if 12 or 24 furcation tubes are required, it is possible to have a breakout holder with only one breakout guide to receive all of the furcation tubes bunched together. As a result, the transition assembly allows a common multi-fiber cable with a plurality of optical fibers to be used with a common transition housing, but allows a user to use one of a variety of breakout holders with a variety of amount and size of breakout guides depending on how many furcation tubes are desired.

An example transition assembly 100 is illustrated in FIGS. 2-10. The illustrated transition assembly 100 includes a transition housing 110 (or housing body) and a breakout holder 114 (or end cap) for transitioning a plurality of optical fibers 102 through a single multi-fiber cable 104 (KEVLAR) into a plurality of furcation tubes 106. In the illustrated example transition assembly 100, twelve optical fibers 102 are transitioned from one multi-fiber cable 104 into three furcation tubes 106, with four optical fibers transitioning into each furcation tube, however any suitable number of optical fibers and/or furcation tubes can be used. Preferably, but not necessarily, the multi-fiber cable 104 is larger than one of the furcation tubes 106.

As particularly shown in FIGS. 3, 7, 9 & 10, the illustrated multi-fiber cable 104 is inserted into, and is received within, a cable inlet 112 in the housing 110. As particularly shown in FIGS. 9 & 10, the distal end of the illustrated multi-fiber cable 104 is inserted into and through the cable inlet 112, and extends beyond by a short distance, for example between about 1/16 inch (1.58 mm) and about 1/4 inch (6.35 mm), preferably about 1/8 inch (3.17 mm), to enter into, a furcation chamber 116 (or breakout chamber) in the housing 110. The illustrated cable inlet 112 and the furcation chamber 116 are operationally and adjacently aligned to form a continuous pathway for the optical fibers 102 to transition out of the multi-fiber cable 104.

Figure 10:
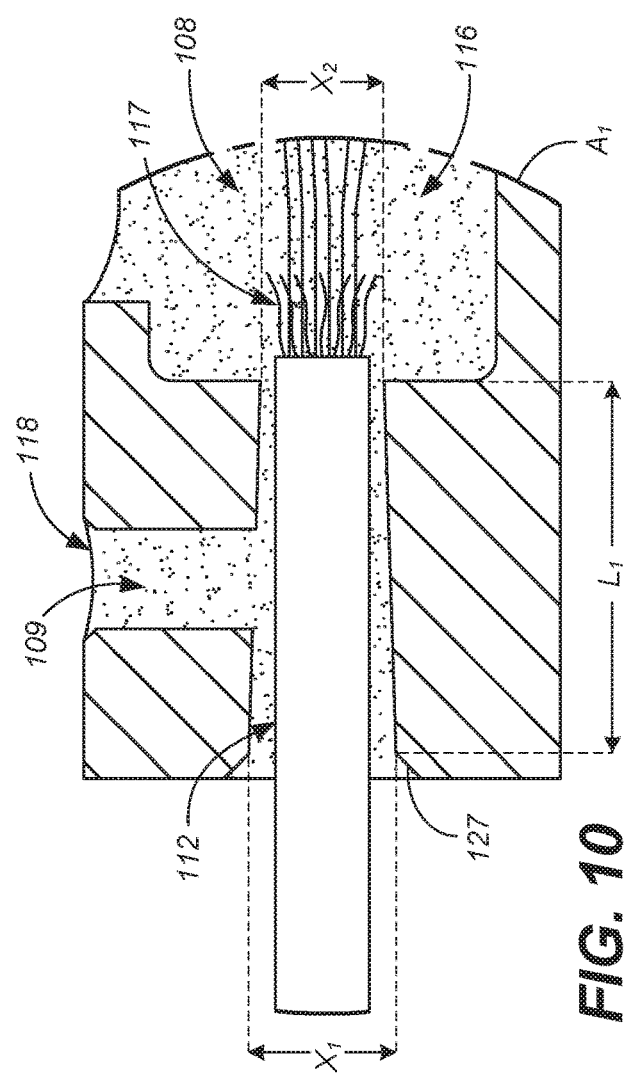
FIG. 10 is an isolated and enlarged view of window Ai shown in FIG. 9.
Figure 11:
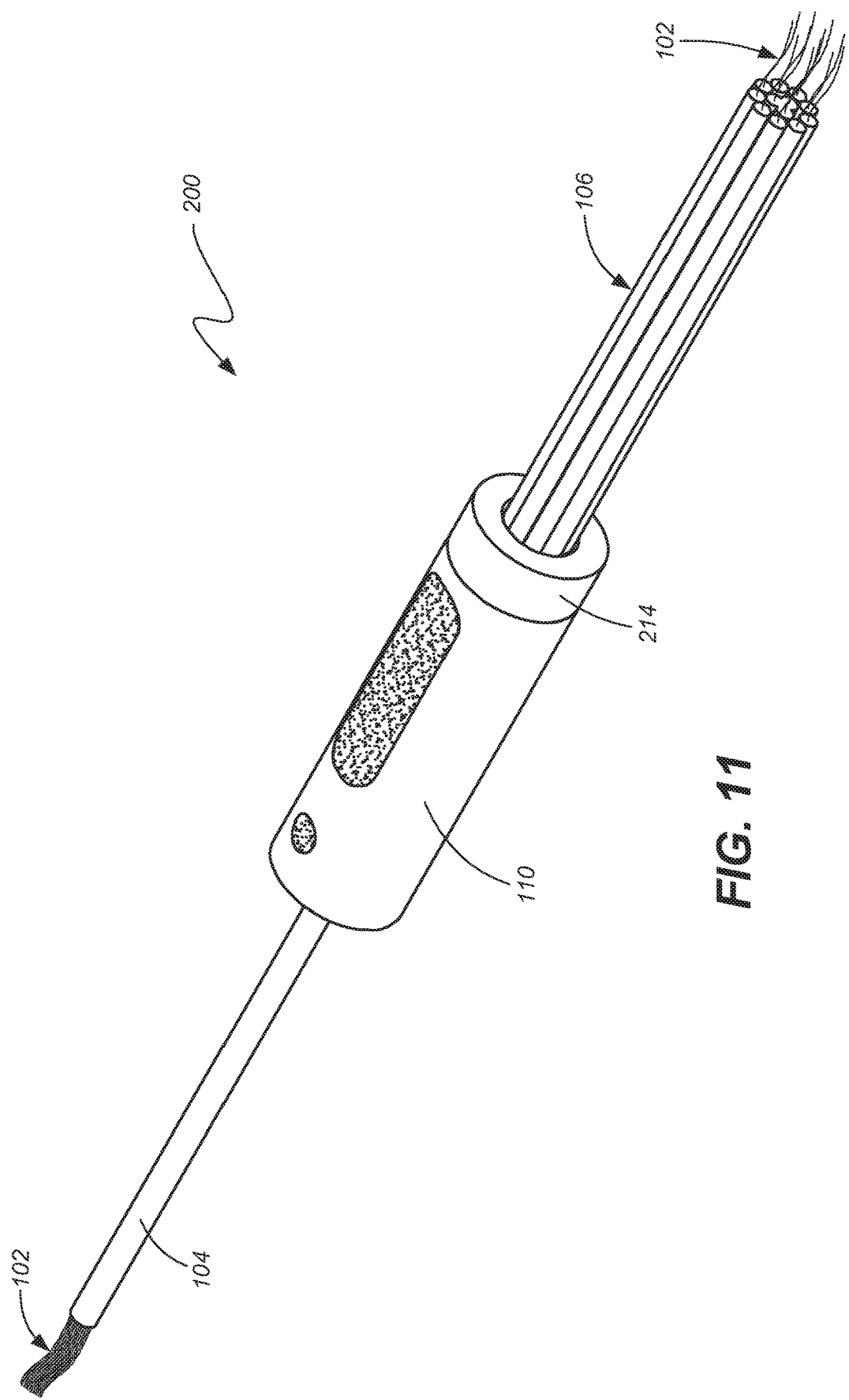
FIG. 11 is a right end perspective view of a transition assembly, according to another example embodiment of the disclosure.
Figure 12:
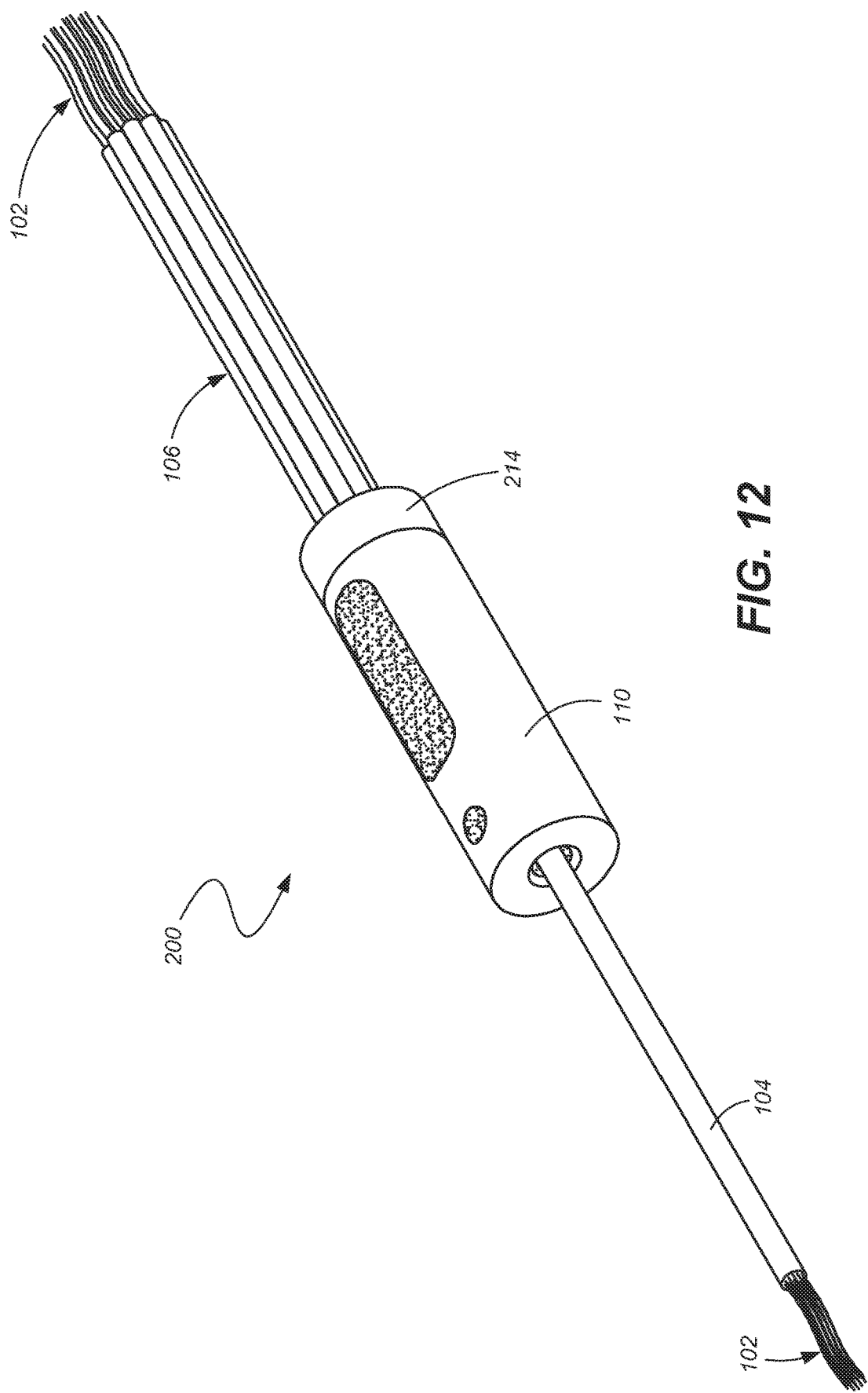
FIG. 12 is a left end perspective view of the transition assembly shown in FIG. 11.
Figure 17:
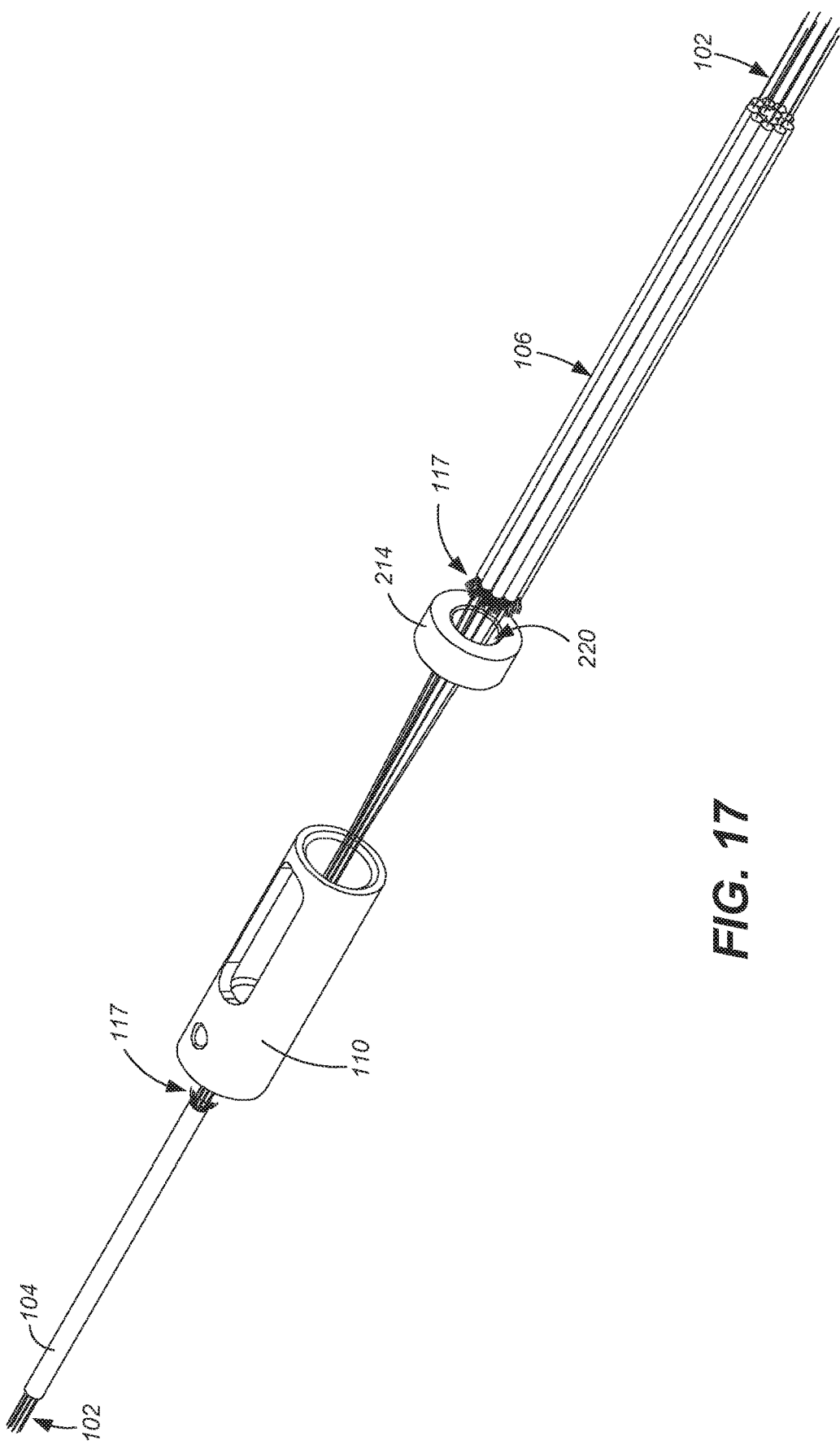
FIG. 17 is an exploded perspective view of the transition assembly shown in FIG. 11.
Figure 18:
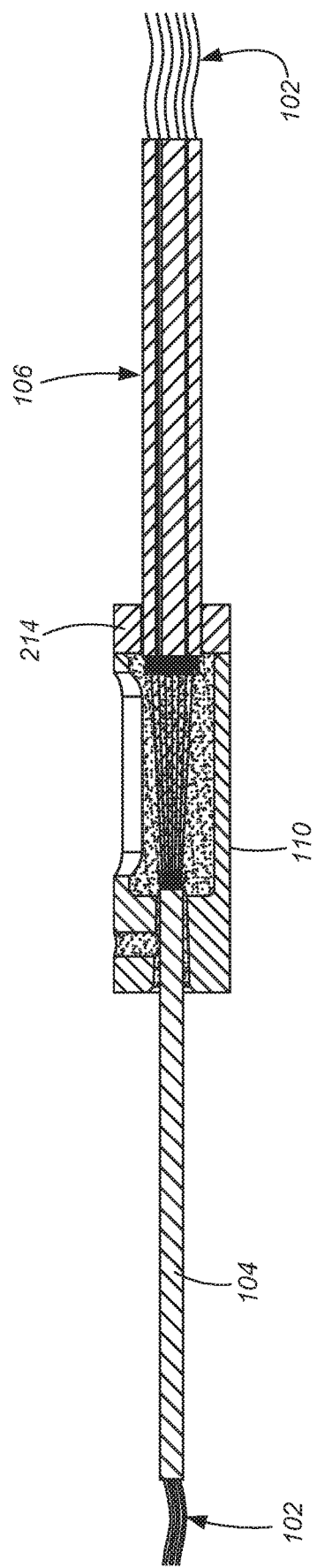
FIG. 18 is a longitudinal side cross-section view of the transition assembly shown in FIG. 14.
Figure 19:
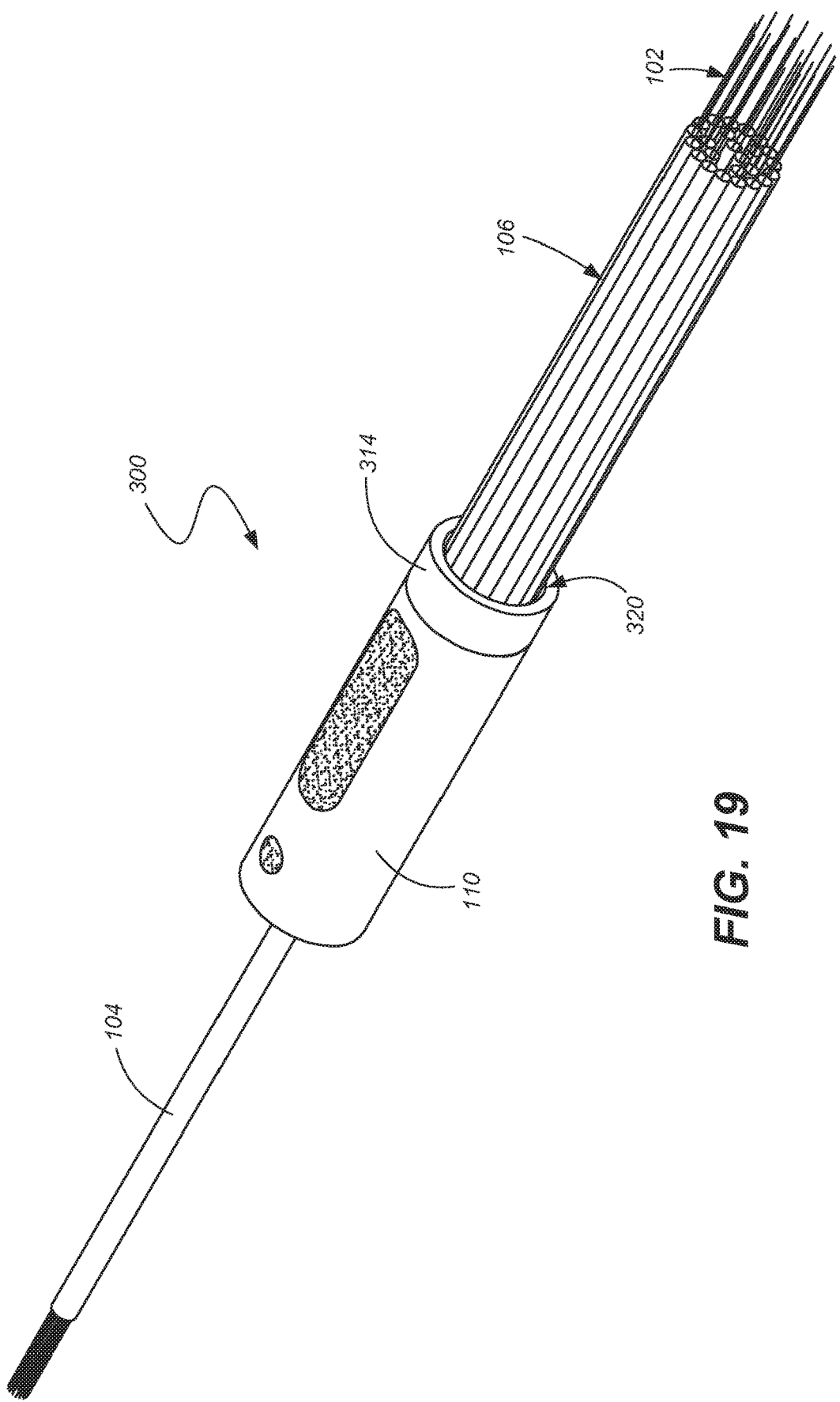
FIG. 19 is a right end view of a transition assembly, according to another example embodiment of the disclosure.
Figure 20:
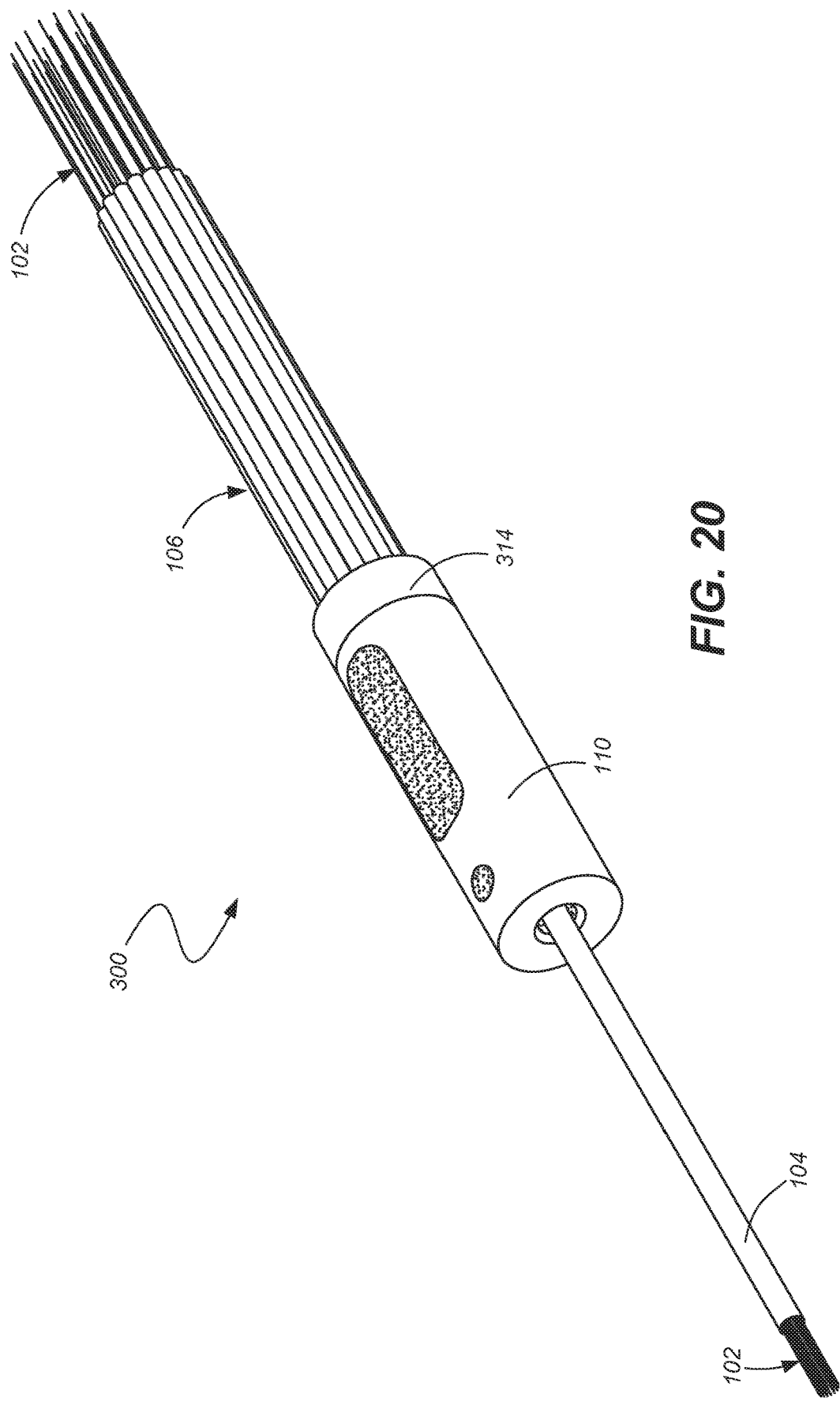
FIG. 20 is a left end view of the transition assembly shown in FIG. 19.
Figure 21:
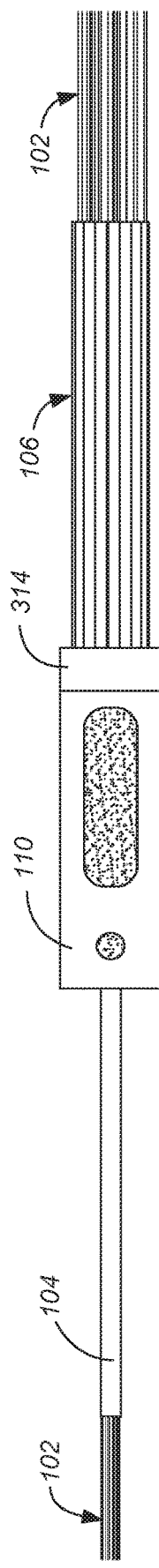
FIG. 21 is a top view of the transition assembly shown in FIG. 19.
Figure 22:
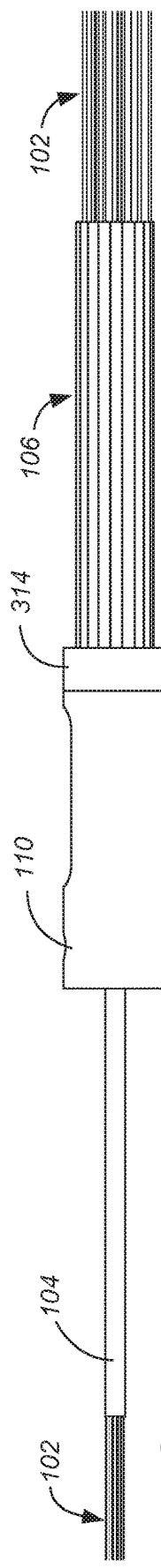
FIG. 22 is a longitudinal side view of the transition assembly shown in FIGS. 19 and 21.
Figure 24:
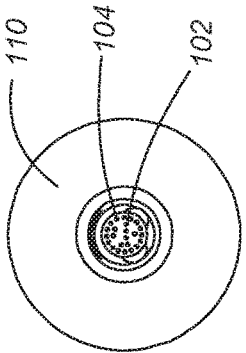
FIG. 24 is a left end view of the transition assembly shown in FIG. 19.
Figure 23:
FIG. 23 is a right end view of the transition assembly shown in FIG. 19.
Figure 25:
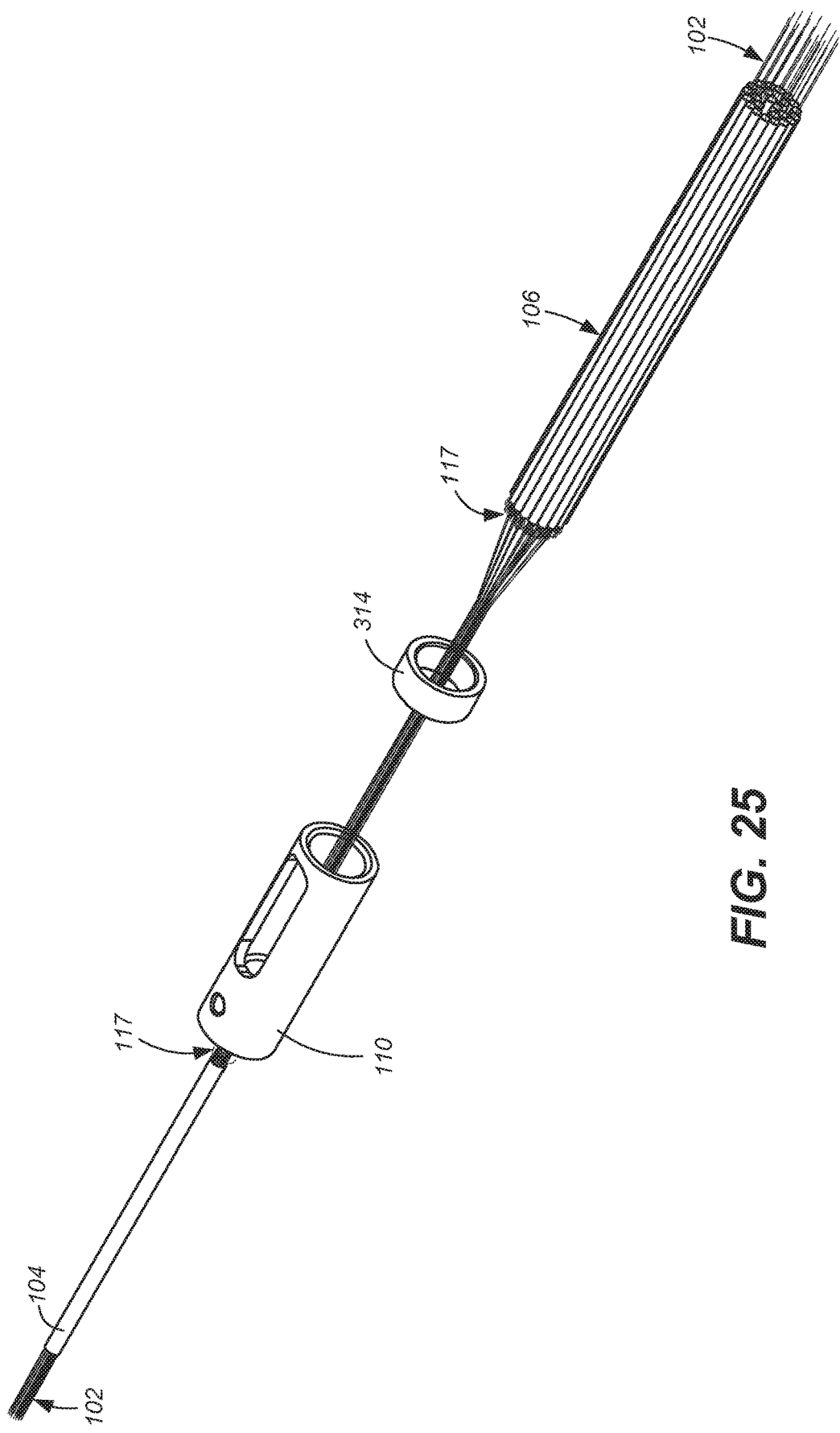
FIG. 25 is an exploded perspective view of the transition assembly shown in FIG. 19.
Figure 26:
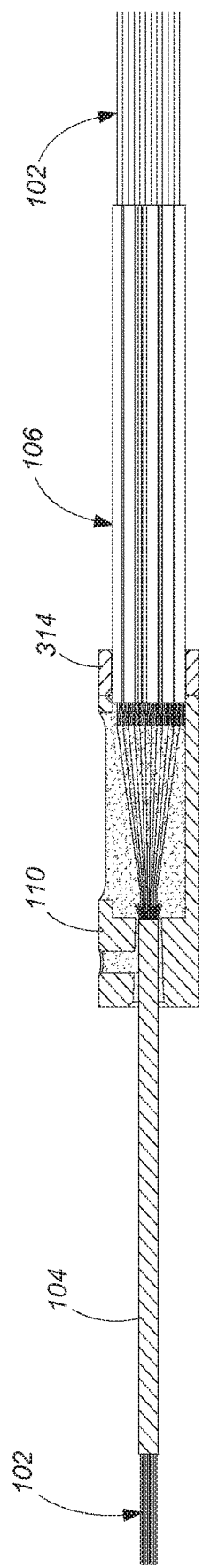
FIG. 26 is a longitudinal side cross-section view of the transition assembly shown in FIG. 22.

As particularly shown in FIG. 10, the illustrated cable inlet 112 is defined by a volume within the housing 110, into which the cable 102 is inserted through an open end opposite the furcation chamber 116. The illustrated cable inlet 112 extends from a first end to a second end. For illustration purposes, the first end is positioned furthest from (distally) the furcation chamber 116 and the second end is closest to (proximal) the furcation chamber. The distance between the first end and the second end of the cable inlet 112 is illustrated by $L_1$. Example length $L_1$ can be within a range of between about 0.40 inches (10.16 mm) and 0.60 inches (15.24 mm), preferably about 0.50 inches (12.7 mm).

The illustrated cable inlet 112 can define a tapered clearance from the first end to the second end. This tapered clearance provides for room for movement, or play, of the cable 104 within the cable inlet 112 during the insertion process. The clearance at the first end is illustrated by $X_1$ and the clearance at the second end is illustrated by $X_2$. The example clearance $X_1$ can be within a range of between about 0.16 inches (4.06 mm) and 0.19 inches (4.83 mm), preferably 0.186 inches (4.72 mm). The example clearance $X_2$ can be within a range of between about 0.13 inches (3.3 mm) and 0.159 inches (4.04 mm), preferably 0.156 inches (3.96 mm). The illustrated cable inlet 112 clearance preferably has a circular geometry, such that the clearance dimensions represent a diameter.

The illustrated cable inlet 112 preferably has a consistent taper between the first end and the second end, for example a slope within a range of between about 4% and 8% (positive or negative depending on the direction measured) preferably about 6%.

Figure 9:
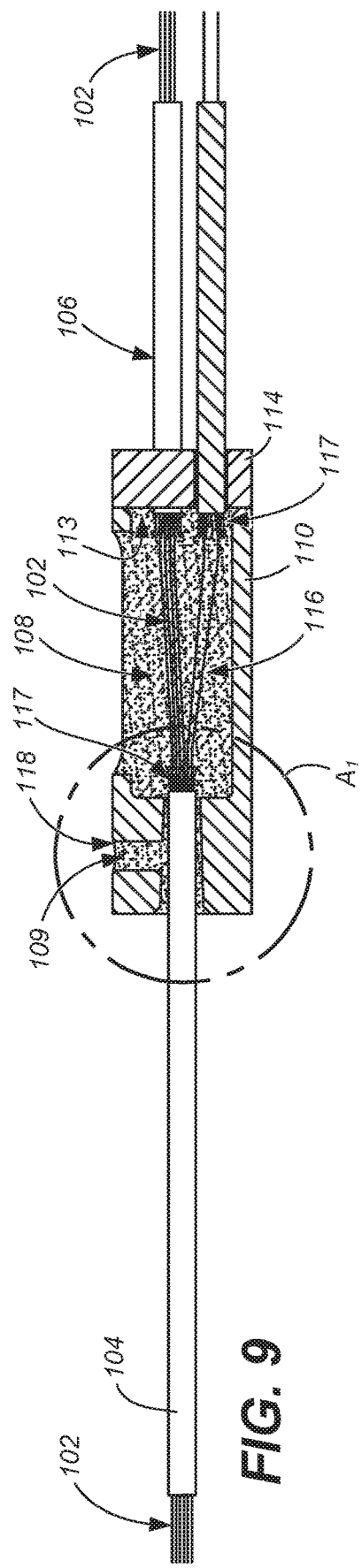
FIG. 9 is a longitudinal side cross-section view of the transition assembly shown in FIG. 5.

In use, as particularly depicted in FIGS. 9 & 10, the cable 104 has a width, or diameter, that is smaller than the first and second end clearances of the cable inlet 112, thus leaving a gap between the cable 104 and the clearance surface of the cable inlet.

Figure 3:
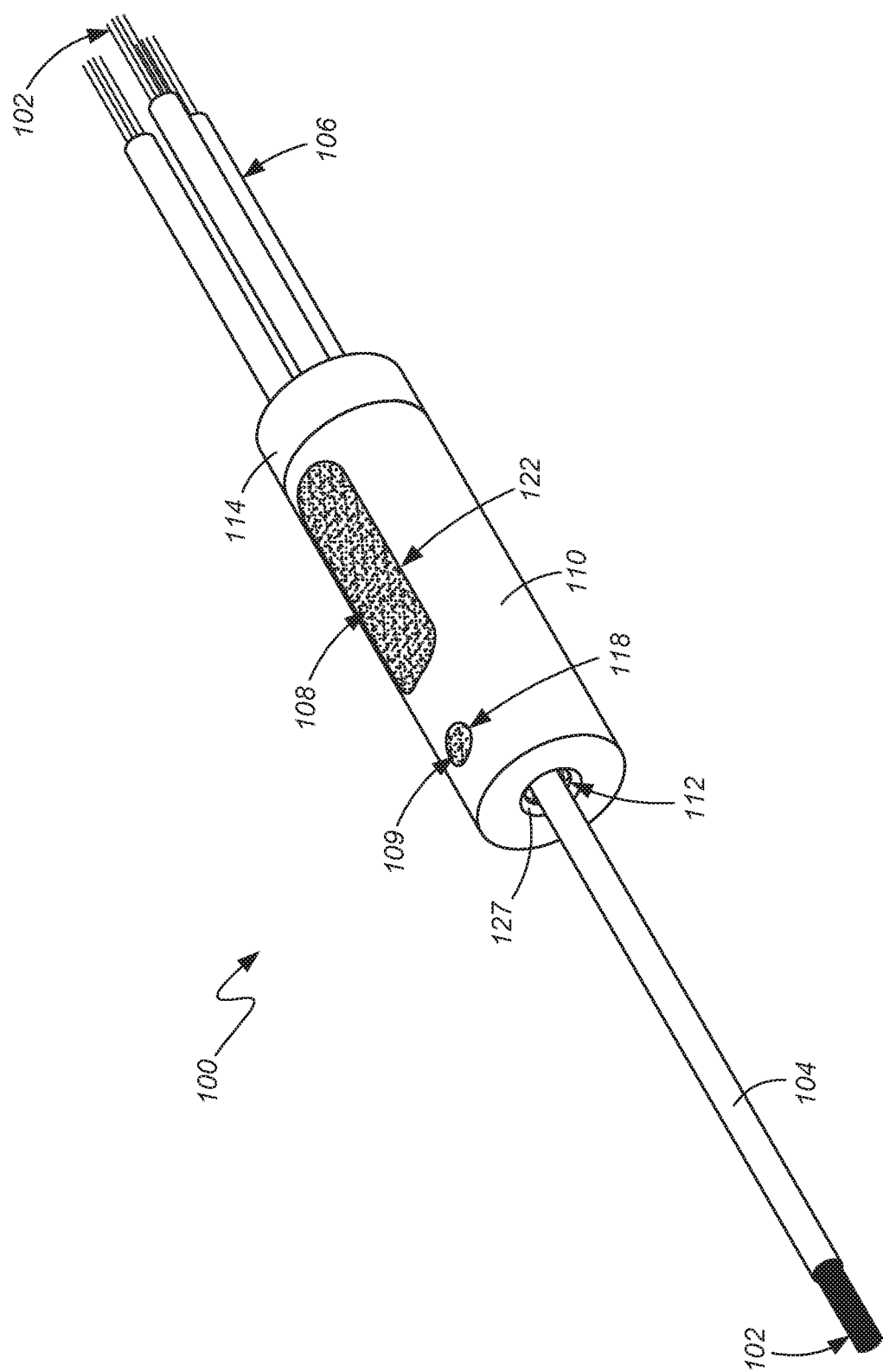
FIG. 3 is a left end perspective view of the transition assembly shown in FIG. 2.

As particularly shown in FIGS. 3, 7 and 10, the illustrated housing 110 can also include a chamfered funnel 127 (surface) to guide the cable 104 into the first end of the cable inlet 112. This chamfered funnel 127 also provides some degree of flexibility to the length of the cable 104 positioned outside the cable inlet 112 and the housing 110.

Figure 8:
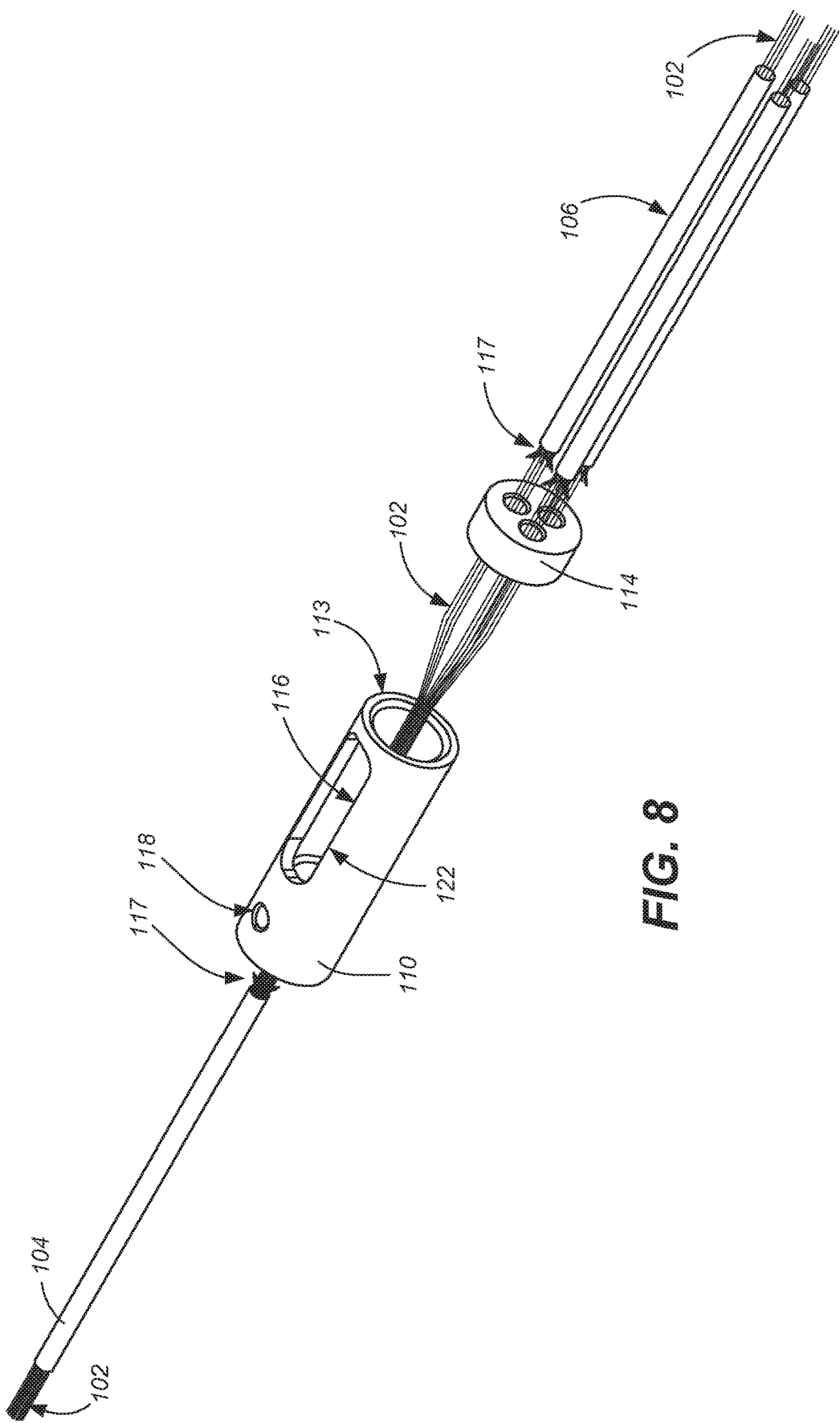
FIG. 8 is an exploded perspective view of the transition assembly shown in FIG. 2.

As particularly depicted in FIGS. 8 & 9, the illustrated furcation chamber 116 is defined by a volume within the housing 110, through which the optical fibers 102 extend between the distal end of the multi-fiber cable 104, near the second end of the cable inlet 112, and an open end 113 in the housing opposite the cable inlet. The furcation chamber 116 preferably has a sufficient volume that the illustrated twelve optical fibers 102 can be transitioned, bare and uncovered from cables, with additional unused gap space.

Assembled, as particularly shown in FIGS. 2-7 & 9, the breakout holder 114 is engaged with the housing 110 at the open end 113. The illustrated breakout holder 114 receives the furcation tubes 106 extending through breakout guides 120 extending through the breakout holder. The illustrated breakout holder 114 includes three breakout guides to receive the three furcation tubes 106, however alternative numbers of breakout guides can be used depending on the number of furcation tubes, for example one, two, three, four, five, six, seven, eight, nine, ten, eleven, twelve, thirteen, fourteen, fifteen, sixteen, seventeen, eighteen, nineteen, twenty, twenty-one, twenty-two, twenty-three and twenty-four. Additionally, there can be an even greater number of breakout guides depending on the number of optical fibers, the number of furcation tubes, and the needs of the user. The breakout guides can be equidistant from each other and/or arranged in a geometric pattern within the breakout holder.

The illustrated breakout guides 120 define a clearance, referenced by dimension $D_1$. The example dimension $D_1$ can be in a range of between about 0.100 inches (2.54 mm) and 0.200 inches (5.08 mm), preferably about 0.140 inches (3.56 mm). The illustrated breakout guides 120 can have a circular geometry, such that the clearance dimension $D_1$ represents a diameter. Preferably, there is a gap between the furcation tubes 106 and the clearance surface of the breakout guide 120.

As particularly shown in FIG. 4, the illustrated breakout holder 114 can have a length referenced by the dimension $X_3$, which can be in a range of between about 0.20 inches (5.08 mm) and 0.30 inches (7.62 mm), preferably 0.25 inches (6.35 mm). The clearance $D_1$ (FIG. 6) of the illustrated breakout guides 120 is preferably consistent along the entire length $X_3$. However, as particularly shown in FIG. 6, each breakout guide 120 can be accessed by a chamfered funnel 125 at the side furthest from the housing 110 in order to provide a range of flexibility to the furcation tubes 106 exiting the breakout guides.

As particularly shown in FIG. 9, when the breakout holder 114 is engaged with the open end 113 of the housing 110, the furcation tubes 106 extend the length $X_3$ of the breakout guides 120, and a short distance into, for example between about 1/16 inch (1.58 mm) and about 1/4 inch (6.35 mm), preferably about 1/8 inch (3.17 mm), the furcation chamber 116 such that a distal end of the furcation tubes terminates very close to the breakout holder within the housing. The optical fibers 102 extend, bare and uncovered, through the furcation chamber 116 between the multi-fiber cable 104 and the furcation tubes 106.

As particularly shown in FIGS. 8-10, as the optical fibers 102 exit the distal ends of the multi-fiber cable 104 and the furcation tubes 106, an amount of aramid yarn 117 is also exposed from within the multi-fiber cable and the furcation tubes. The aramid yarn 117 is included to provide protection and support to the optical fibers 102 extending through the multi-fiber cable 104 and the furcation tubes 106.

Assembled, as particularly shown in FIGS. 2-7 & 9, when the breakout holder 114 supporting the furcation tubes 106 is engaged with the open end 113 of the housing 110, the furcation chamber 116 becomes substantially contained. A volume of epoxy 108, as illustrated by the speckled features, is inserted or injected into the furcation chamber 116, and a small amount may naturally enter gap in the cable inlet 112 surrounding the cable 104 and the gap in the breakout guides 120 surrounding the furcation tubes 106. The epoxy 108 is then allowed to dry and harden, thus fixing the optical fibers 102 and aramid yarn 117 within the furcation chamber 116, and fixing the breakout holder 114 in hardened engagement with the housing 110. Any amount of hardened epoxy 108 entering the cable inlet 112 and/or breakout guides 120 can also fix the cable 104 and furcation tubes 106 in position within the cable inlet and breakout guides, respectively. Once the volume of epoxy 108 is hardened, the cable 104, housing 110, optical fibers 102, aramid yarn 117, breakout holder 114, and the furcation tubes 106 become a single and solid unit.

The volume of epoxy 108 is inserted or injected into the furcation chamber 116 through an insertion window 122 extending through the housing 110 to access the furcation chamber. The illustrated insertion window 122 can have an elongated rectangular shape, however, any geometry which allows for a volume of the epoxy 108 to be introduced into the furcation chamber 116 can be effective.

A volume of adhesive 109, indicated with speckle features, is inserted or injected through an insertion port 118 extending through the housing 110 to access the cable inlet 112. The illustrated insertion port 118 can have circular shape, however, any geometry which allows for a volume of adhesive 109 to be introduced into the cable inlet 112 can be effective. The adhesive 109 hardens in contact with the multi-fiber cable 104 to fix the multi-fiber cable in position within the cable inlet 112. Preferably, during assembly, the multi-fiber cable 104 is fixed within the cable inlet 112 with the adhesive 109 before the breakout guide 114 engages the open end 13 of the housing 110, before the furcation tubes 106 are inserted into the breakout guides 120, and before the epoxy 108 is injected into the furcation chamber 116.

To prepare the transition assembly 100, a sufficient length of the multi-fiber cable 104 outer jacket is cut away to expose a length of the optical fibers 102 and an amount of aramid yarn 117 therein. The exposed optical fibers 102, aramid yarn 117 and distal cut end of the cable 104 are inserted through the cable inlet 112 until the distal end of the cable slightly extends out of the cable inlet into the furcation chamber 116. In this condition, a significant length of uncovered bare optical fibers 102 extends through the length of the furcation chamber 116 and through the open end 113 of the housing 110. A volume of the adhesive 109 is then injected into the insertion port 118 to fix the cable 104 within the cable inlet 112.

The optical fibers 102 are then divided into groups based on the number of furcation tubes 106 to be used in the breakout assembly. Preferably, these groups will each have the same number of optical fibers 102. As illustrated, the optical fibers 102 are divided into three groups of four fibers.

The breakout holder 114 is then positioned so that each group of optical fibers 102 is inserted through the breakout guides 120. The breakout holder 114 then slides over the optical fibers 102 into engaged alignment with the open end 113 of the housing 110 to substantially contain and define the furcation chamber 116.

The furcation tubes 106 are then fitted over the optical fibers 102 extending through the breakout guides 120. As illustrated, three furcation tubes 106 are fitted over the three groups of optical fibers 102. Preferably, an amount of aramid yarn 117 is exposed from within the furcation tubes 102. The furcation tubes 106 are then further fitted over the optical fibers 102 until the furcation tubes are inserted into the breakout guides 120 of the breakout holder 114 and a length of the optical fibers extends bare and uncovered through the furcation chamber 116. In this position, the distal end of the furcation tubes 106, and an amount of aramid yarn 117, are slightly inserted out of the breakout guides 120 and into the furcation chamber 116. Preferably, an appropriate amount of tension is applied to the cable 104 and furcation tubes 106 to ensure that the optical fibers 102 are generally straight within the furcation chamber 116.

A volume of the epoxy 108 is then injected through the insertion window 122 into the furcation chamber 116. Preferably, the amount of epoxy 108 injected fills the furcation chamber 116 entirely. Naturally, an amount of the epoxy 108 will also enter, or seep into, the cable inlet 112 and the breakout guides 120. The epoxy 108 is then left and allowed to harden or solidify, forming the single and solid transition assembly 100.

An additional example transition assembly 200 is illustrated in FIGS. 11-18. The illustrated transition assembly 200 includes the housing 110 and cable 104, as they are described above in FIGS. 2-10. The illustrated transition assembly 200 includes the same furcation tubes 106 as they are described above. The illustrated transition assembly 200 includes the same optical fibers 102 as they are described above. The illustrated transition assembly 200 includes the same number (twelve) of optical fibers 102 as described above. The illustrated transition assembly 200 fits each optical fiber 102 individually into a furcation tube 106, such that there are twelve furcation tubes.

Assembled, as particularly shown in FIGS. 11-14 and 18, a breakout holder 214 is engaged with the housing 110 at the open end of the furcation chamber, as described in the embodiment above in FIGS. 2-10. The illustrated breakout holder 214 receives the furcation tubes 106 in a breakout guide 220 extending through the breakout holder. The illustrated breakout holder 214 includes a single breakout guide 220 to receive all of the furcation tubes 106 bundled together. For example, the illustrated breakout holder 214 can have an annular ring geometry.

The illustrated breakout guide 220 defines a clearance, referenced by dimension $D_2$. The example dimension $D_2$ can be in a range of between about 0.250 inches (6.35 mm) and 0.500 inches (12.7 mm), preferably between about 0.300 inches (7.62 mm) and about 0.400 inches (10.16 mm), and more preferably about 0.313 inches (7.95 mm). The illustrated breakout guide 220 can have a circular geometry, such that the clearance dimension $D_2$ represent a diameter.

The illustrated breakout holder 214 can have the same length, referenced by the dimension $X_3$, as the breakout holder 114 described above in FIG. 4. The clearance $D_2$ of the illustrated breakout guide 220 is preferably consistent along the entire length $X_3$. As illustrated particularly in FIG. 15, gaps of unoccupied space remain between adjacent furcation tubes 106 and the clearance surface of the breakout guide 220.

The illustrated transition assembly 200 is prepared in the same manner and according to the same procedure as described above. The epoxy 108 is also inserted into the gaps between the furcation tubes 106 and the clearance surface of the breakout guide 220. Once the volume of epoxy 108 is hardened, the cable 104, housing 110, breakout holder 214, and the furcation tubes 106 become a single and solid unit.

An additional example transition assembly 300 is illustrated in FIGS. 19-26. The illustrated transition assembly 300 includes the same housing 110 and cable 104, as they are described above. The illustrated transition assembly 300 includes the same furcation tubes 106 as they are described above, however, a greater number of, for example twenty-four, furcation tubes is included. The illustrated transition assembly 300 includes the same optical fibers 102 as they are described above, however, a greater number of, for example twenty-four, optical fibers is included. The illustrated transition assembly 300 fits each optical fiber 102 individually into a furcation tube 106, such that there are twenty-four furcation tubes for twenty-four optical fibers.

Assembled, as particularly shown in FIGS. 19-22 and 26, a breakout holder 314 is engaged with the housing 110 at the open end of the furcation chamber, as described above. The illustrated breakout holder 314 receives the furcation tubes 106 extending through a breakout guide 320 extending through the breakout holder. The illustrated breakout holder 314 includes a single breakout guide 320 to receive all of the furcation tubes 106 bundled together. For example, the illustrated breakout holder 314 can have an annular ring geometry.

The illustrated breakout guide 320 defines a clearance, referenced by dimension $D_3$. The example dimension $D_3$ can be in a range of between about 0.250 inches (6.35 mm) and 0.500 inches (12.7 mm), preferably between about 0.400 inches (10.16 mm) and about 0.500 inches (12.7 mm), and more preferably about 0.453 inches (11.5 mm). The illustrated breakout guide 320 can have a circular geometry, such that the clearance dimension $D_3$ represent a diameter.

The illustrated breakout holder 314 can have the same length, referenced by the dimension $X_3$ described above. The clearance $D_3$ of the illustrated breakout guide 320 is preferably consistent along the entire length $X_3$. As illustrated particularly in FIG. 23, gaps of unoccupied space remain between adjacent furcation tubes 106 and the surface of the breakout guide 320.

The illustrated transition assembly 300 is prepared in the same manner and according to the same procedure as described above. The epoxy 108 is also inserted into the gaps between the furcation tubes 106 and the clearance surface of the breakout guide 320. Once the volume of epoxy 108 is hardened, the cable 104, housing 110, breakout holder 314, and the furcation tubes 106 become a single and solid unit.

PARTS LIST

10 Breakout Cable
12 Multi-fiber Cable
14 Multi-fiber Connector
16 Furcation Tube
18 Fiber-optic Connector
20 Breakout
100 Transition Assembly
102 Optical Fibers
104 Cable 106 Furcation Tubes
108 Epoxy
109 Adhesive
110 Housing
112 Cable Inlet
113 Open End
114 Breakout Holder
116 Furcation Chamber
117 Aramid Yarn
118 Insertion Port
120 Breakout Guide
122 Insertion Window
125 Chamfered-surface Funnel
127 Chamfered-surface Funnel
200 Transition Assembly
214 Breakout Holder
220 Breakout Guide
300 Transition Assembly
314 Breakout Holder
320 Breakout Guide Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A breakout transition assembly comprising:
a plurality of optical fibers extending through a cable, a plurality of furcation tubes and a housing comprising a cable inlet leading to a furcation chamber, the cable, optical fibers and furcation tubes being fixed relative to the housing with a volume of hardened epoxy in the furcation chamber;
the housing defining an insertion window in communication with the furcation chamber for inserting adhesive into the furcation chamber through the insertion window; and
the housing defining an insertion port in communication with the cable inlet for inserting adhesive into the cable inlet through the insertion port,
wherein, the cable inlet defines an axis and comprises a clearance that tapers and narrows continuously along the axis between a first end and a second end, the second end being positioned at the furcation chamber, a cross-sectional area of the cable inlet perpendicular to the axis at the second end being smaller than a cross-sectional area of the furcation chamber perpendicular to the axis at the first end.

2. The breakout transition assembly of claim 1, wherein the cable inlet clearance tapers from a first end diameter of between about 0.16 inches and 0.19 inches to a second end diameter of between about 0.13 inches and 0.159 inches.

3. The breakout transition assembly of claim 1, wherein the cable inlet clearance tapers from a first end diameter of about 0.186 inches to a second end diameter of about 0.156 inches.

4. The breakout transition assembly of claim 1, wherein the cable inlet clearance has a slope of between about 4% and 8%.

5. The breakout transition assembly of claim 1, wherein the cable inlet clearance has a slope of about 6%.

6. The breakout transition assembly of claim 1, wherein the cable inlet extends along the axis a length of between about 0.40 inches and 0.60 inches.

7. The breakout transition assembly of claim 1, wherein the cable inlet extends along the axis a length of about 0.50 inches.

8. A breakout transition assembly comprising:
a plurality of optical fibers extending through a cable, a plurality of furcation tubes and a transition body comprising a cable inlet and a furcation chamber, the cable, optical fibers and furcation tubes being fixed relative to the transition body with a volume of hardened epoxy in the furcation chamber, the cable inlet defining a cable insertion axis and comprising a first gap between a surface of the cable inlet and the cable, the first gap extending along an entire length parallel to the axis of the cable inlet between a first end and a second end of the cable inlet, the first gap narrowing continuously along the axis between the first end and the second end, the second end being positioned at the furcation chamber, a cross-sectional area of the cable inlet perpendicular to the axis at the second end being smaller than a cross-sectional area of the furcation chamber perpendicular to the axis at the first end; and
a breakout holder comprising at least one guide, the plurality of furcation tubes being received in the at least one guide, the at least one guide defining a second gap between a surface of the at least one guide and the furcation tubes, the second gap extending along an entire length parallel to the axis of the at least one guide;
wherein the volume of hardened epoxy extends from the furcation chamber into the first gap and into the second gap such that the cable is fixedly received in the cable inlet and the plurality of furcation tubes are fixedly received in the at least one guide in the breakout holder, and wherein the volume of hardened epoxy retains the breakout holder in an engaged position with the transition body.

9. The breakout transition assembly of claim 8, wherein the second gap is between about 0.250 inches and 0.500 inches.

10. The breakout transition assembly of claim 8, wherein the second gap is between about 0.300 inches and 0.460 inches.

11. The breakout transition assembly of claim 8, wherein the second gap is between about 0.313 inches and 0.453 inches.

12. The breakout transition assembly of claim 8, wherein the second gap comprises a circular clearance.

13. The breakout transition assembly of claim 8, wherein the breakout holder comprises a length of between about 0.20 inches and 0.30 inches.

14. The breakout transition assembly of claim 8, wherein the breakout holder comprises a length of about 0.25 inches.

15. The breakout transition assembly of claim 8, wherein the breakout holder comprises a plurality of guides.

16. The breakout transition assembly of claim 15, wherein the second gap is between about 0.100 inches and 0.200 inches.

17. The breakout transition assembly of claim 15, wherein the second gap is about 0.140 inches.

18. The breakout transition assembly of claim 15, wherein the second gap comprises a circular clearance.

19. The breakout transition assembly of claim 15, wherein the breakout holder comprises exactly 2, 3, or 4 guides.

20. The breakout transition assembly of claim 15, wherein the breakout holder comprises 3 guides.

21. The breakout transition assembly of claim 8, wherein the breakout holder comprises a plurality of guides positioned equidistantly from each other.

22. The breakout transition assembly of claim 8, wherein the breakout holder comprises a plurality of guides positioned in a geometric arrangement.

23. The breakout transition assembly of claim 8, further comprising an insertion window accessing the furcation housing, the volume of epoxy being inserted into the furcation housing through the insertion window.

24. The breakout transition assembly of claim 8, further comprising an insertion port accessing the cable inlet, wherein a volume of adhesive is inserted into the cable inlet through the insertion port.

25. A method of assembling a breakout transition assembly, the method comprising:

exposing a length of a plurality of optical fibers from within a multi-fiber cable;

inserting the exposed plurality of optical fibers through a cable inlet in a housing, the cable inlet defining a cable insertion axis and a first gap between a surface of the cable inlet and the cable, the first gap extending along an entire length parallel to the axis of the cable inlet between a first end and a second end of the cable inlet, the first gap narrowing continuously along the axis between the first end and the second end, the second end being positioned at the furcation chamber, a cross-sectional area of the cable inlet perpendicular to the axis at the second end being smaller than a cross-sectional area of the furcation chamber perpendicular to the axis at the first end, wherein the plurality of optical fibers extend through a furcation chamber in the housing;

inserting the plurality of optical fibers through at least one breakout guide;

fitting a plurality of furcation tubes over the plurality of optical fibers, and engaging the at least one breakout guide with the housing, the at least one breakout guide defining a second gap between a surface of the at least one guide and the furcation tubes, the second gap extending along an entire length parallel to the axis of the at least one guide; and fixing the housing, breakout guide, cable, optical fibers and furcation tubes together in a single body with hardening epoxy by injecting the hardening epoxy into the furcation chamber and into the first gap and the second gap.

* * * * *